(12) United States Patent
Martin et al.

(10) Patent No.: US 7,937,339 B2
(45) Date of Patent: May 3, 2011

(54) METHOD AND APPARATUS FOR USING BAYESIAN NETWORKS FOR LOCALIZATION

(75) Inventors: Richard Martin, Metuchen, NJ (US); Konstantinos Kleisouris, New Brunswick, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 12/442,456

(22) PCT Filed: Sep. 21, 2007

(86) PCT No.: PCT/US2007/020444
§ 371 (c)(1),
(2), (4) Date: Jul. 7, 2009

(87) PCT Pub. No.: WO2008/036386
PCT Pub. Date: Mar. 27, 2008

(65) Prior Publication Data
US 2009/0287623 A1 Nov. 19, 2009

Related U.S. Application Data

(60) Provisional application No. 60/846,378, filed on Sep. 21, 2006.

(51) Int. Cl.
*G06N 3/00* (2006.01)

(52) U.S. Cl. ...................... 706/13; 455/456.1; 455/456.5

(58) Field of Classification Search .................... 706/13; 455/456.1, 456.5
See application file for complete search history.

(56) References Cited

U.S. PATENT DOCUMENTS

| 7,095,979 B2* | 8/2006 | Stout .............................. 434/353 |
| 2006/0023723 A1* | 2/2006 | Morara ...................... 370/395.6 |
| 2006/0205417 A1 | 9/2006 | Ju | |

OTHER PUBLICATIONS

"Classification of Chirp Signals Using Hierarchical Bayesian Learning and MCMC Methods", M. Davy, C. Doncarli, and J-Y. Tourneret, IEEE Transactions on Signal Processing, vol. 50, No. 2, Feb. 2002, pp. 377-388.*
"The Robustness of Localization Algorithm to Signal Strength Attacks: A Comparative Study", Y. Chen, K. Kleisouris, X. Li, W. Trappe, and R. P. Martin, DCOSS 2006, Lecture Notes in Computer Science, vol. 4026, pp. 546-563.*
Webb, Andrew R., Statistical Pattern Recognition, end edition, John Wiley & Sons, Ltd, West Sussex, England, 2002, pates 55-63 paragraph 2.4.2.

* cited by examiner

*Primary Examiner* — Donald Sparks
*Assistant Examiner* — Mai T Tran
(74) *Attorney, Agent, or Firm* — Fox Rothschild LLP

(57) ABSTRACT

The invention is a technique for performing sampling in connection with Markov Chain Monte Carlo simulations in which no attempt is made to limit the selected samples to a selected slice of the entire sample domain, as is typical in Markov Chain Monte Carlo sampling. Rather, samples are taken from the entire domain and any samples that fall below a randomly selected probability density level are discarded.

17 Claims, 26 Drawing Sheets

Model $M_1$

Model $M_2$

Model $A_1$

METHOD AND APPARATUS FOR USING BAYESIAN NETWORKS FOR LOCALIZATION

CROSS REFERENCE TO RELATED APPLICATIONS

This application is a National Stage filing under 35 U.S.C. §371(c) of International Application Serial No. PCT/US07/20444 filed Sep. 21, 2007, which, in turn, claims the benefit under 35 U.S.C. §119(e) to U.S. Provisional Patent Application Ser. No. 60/846,378 which was filed on Sep. 21, 2006, the disclosures of which are incorporated herein by reference.

FIELD OF THE INVENTION

The invention pertains to the generation of distributions that correspond to probability density functions for Bayesian networks. The invention is particularly adapted to reduce the computational load of using Bayesian networks for localization applications, but is not limited thereto.

BACKGROUND OF THE INVENTION

Bayesian networks often are used in the process of determining probability distribution functions in multi-variable universes. One particular application in which Bayesian networks are commonly used to generate distributions that follow probability density functions is in localization techniques for mobile wireless devices.

Particularly, in wireless communication environments such as IEEE 802.11b or 802.11g wireless LANs, it is often a desirable feature to determine the location of a mobile wireless device using the network based on the characteristics of signals from the mobile wireless device received at multiple antennas of the wireless network (or vice versa). The characteristics are ones that are indicative of the location of the device relative to the landmarks. For instance, received signal strength (e.g., RSSI) or signal-to-noise ratio (S/N) are indicative of the distance between the landmark and the mobile device. On the other hand, using directional antennas, the angle of arrival of the signal can be used as an indicator of the bearing of the mobile device relative to the landmark.

The localization can be determined either by the devices themselves or by the network. That is, in some localization systems, the network determines the location of the wireless devices based on data collected by the landmarks and transmitted through the network to a central processing unit that determines the location of the devices. However, in other wireless device location systems, the wireless devices themselves may measure the characteristics of signals received from the landmarks to determine their own locations. In some applications of the latter type, the mobile wireless device may then transmit its own location to the network for use by other network equipment. In other applications, however, the mobile wireless device may be the only equipment that needs to know its location, such that the location as determined by the mobile wireless device need not be transmitted to any other equipment at all.

In order to simplify the following discussion, the following discussion shall speak in terms of an exemplary wireless network localization system in which the landmarks measure signal characteristics of signals transmitted from the mobile wireless devices as received at multiple landmarks of the network to determine the locations of the mobile wireless devices. However, the relevant principles would be equally applicable to localization systems using the inverse operational paradigm noted above.

There are any number of practical applications for such mobile wireless device localization. For instance, in hospitals and manufacturing plants, it may be desirable to track down the location of an individual or a piece of equipment using such a technique. The individual can be equipped with a wireless device (which may simply be the individual's personal cell phone) that communicates with the wireless LAN. The person can be located by locating the wireless device (assuming, obviously, that the person is carrying the wireless device on his or her person). Additionally, portable equipment can be equipped with a wireless transmitter and/or transceiver so that it can be located using such localization techniques.

Several different techniques are available for mobile wireless device localization. These techniques generally involve the gathering of information about one or more characteristics of the signals received from the wireless devices at a plurality of landmarks in the wireless network environment (or alternately signals received at the mobile wireless devices from a plurality of network landmarks). A landmark generally is a stationary wireless transmitter, receiver, or transceiver having a known location and that can communicate with the mobile wireless devices. Thus, for instance, landmarks typically include network base stations and other fixed position network nodes. These types of landmarks usually have both wireless and wired capabilities so that they can serve as a connection point between the wireless portion of a network and the wired portion of the network. However, alternately, a landmark need not be a communication node of the network. A landmark can be placed in the area covered by the wireless network strictly as a transmitter or receiver strictly for the purpose of providing a network landmark for use in localization of mobile wireless devices.

There are many different general techniques for wireless device localization, including triangulation, trilateration, and scene-matching.

In scene-matching, for instance, one first builds a map of the wireless network by placing a wireless device at multiple locations in the wireless network environment and recording signal characteristics of signals transmitted by the device as received at multiple landmarks for each such location to build a scene map of signal characteristics as a function of location. Once a scene map is built and stored, an algorithm tries to match the signal characteristics of each wireless device to the location in the scene map that most closely corresponds to those signal characteristics.

On the other hand, in systems that utilize triangulation, the landmarks use directional antennas so that they can measure the angle of arrival of signals at the landmarks to determine the relative bearing between the wireless device and each of the landmarks. By correlating the bearing data of multiple landmarks, the location of the device can be predicted by relatively simple trigonometric algorithms.

In lateration, signal characteristics such as RSSI and/or S/N of signals received from a wireless device at a plurality of landmarks are used as an indication of the distance between the wireless device and the various landmarks. Time of Flight is another characteristic that can be determined and used as an indication of distance. Given the distance between the wireless device and a plurality of different landmarks, the location of the device can be predicted by lateration equations. (Note the use of the term lateration, rather than the more common term trilateration in order to avoid any implication that there must be three and only three reference points (or landmarks).

If RSSI or S/N were closely correlated to the distance between a wireless device and a landmark, then making a fairly reliable prediction of the location of wireless devices would be a computationally simple task. However, that is not the case in the real world. Both RSSI and S/N are affected by many factors in addition to the distance between the device and a landmark. For instance, RSSI and S/N are dependent on the number of walls or other obstacles between the two devices, the relative humidity, interference with other RF devices, etc.

All of these variables, including distance, are unknown and it is practically impossible to develop a closed equation set to solve for location in a real-world environment. Accordingly, such problems are commonly solved using predictive statistical methods such as Bayesian networks using Markov Chain Monte Carlo and other such simulations, which are well known statistical modeling techniques.

Bayesian networks and Markov Chain Monte Carlo simulations are well known in the field of statistics and, in fact, are already being used in mobile wireless device localization systems. However, as the number of dimensions in the network (i.e., the number of unknown variables that must be solved for) increases, the computational load can very quickly exceed reasonable signal processing capabilities. For instance, Markov Chain Monte Carlo simulations involve the collection of many "samples", wherein each sample comprises one specific value assigned to each of the variables. In a typical mobile wireless device localization system, there likely will be at least five variables, including some or all of X coordinate, Y coordinate, Z coordinate, and at least two or three distinct signal propagation constants. With five or more dimensions, the computational load necessary to generate a probability density function using Bayesian networks and Markov Chain Monte Carlo simulations is significant and difficult to perform in real time using the hardware and software that is practically available.

It would be desirable to reduce the processing load to perform mobile wireless device localization.

It also would be desirable in general to simplify the use of Bayesian networks and Markov Chain Monte Carlo simulations in statistical analysis.

SUMMARY OF THE INVENTION

The invention is a technique for performing sampling in connection with Markov Chain Monte Carlo simulations in which no attempt is made to limit the selected samples to a selected slice of the entire sample domain, as is typical in Markov Chain Monte Carlo sampling. Rather, samples are taken from the entire domain and any samples that fall below a randomly selected probability density level are discarded.

An embodiment of the invention also includes a computer program product embodied on a computer readable medium for sampling for purposes of generating a sequence of instances of a Bayesian network such that a distribution of values across the sequence of instances follows the same distribution as the actual probability density function for at least one variable.

This substantially reduces the computational load for generating a probability density function using Markov Chain Monte Carlo simulations. Particularly, the computational load to determine the domain slice employed in a conventional Markov Chain Monte Carlo simulation is significant, particularly as the number of dimensions in the network increases.

DETAILED DESCRIPTION OF THE INVENTION

Introduction

Figure 1:
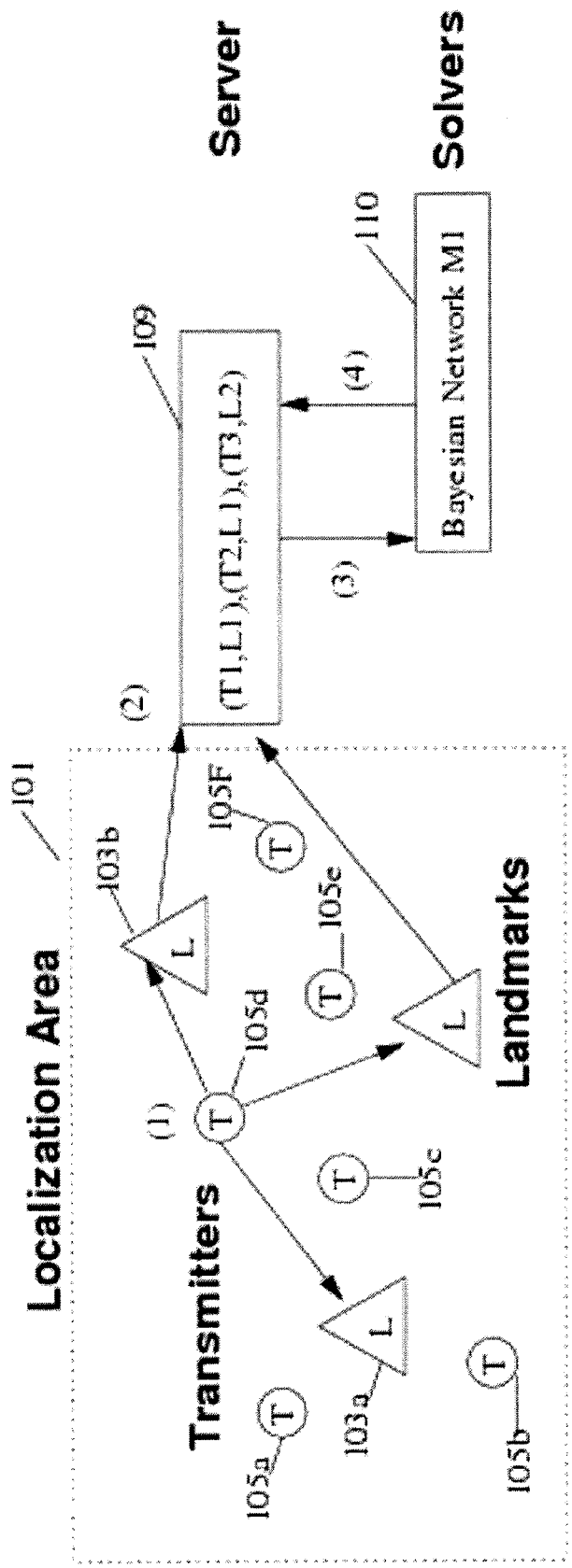
FIG. 1 is a block diagram representing the major components of a wireless network including wireless network a incorporating a wireless device localization.

FIG. 1 is a block diagram illustrating the basic components found in a wireless network incorporating wireless device localization. For sake of simplicity, let us consider a network in which the landmarks gather the data to be used for localization and the landmarks report that data to a localization signal processing node in the wired portion of the network, which determines the location of the mobile wireless device system.

Rectangle 101 represents the physical volume within which wireless device localization is performed. There are a plurality of landmarks 103a, 103b, 103c spread throughout the localization volume 101. Furthermore, a plurality of wireless devices 105a, 105b, 105c, 105ed, 105e, 105f are located within volume 101. Exemplary wireless device 105d communicates with a plurality of the landmarks 103a, 103b, 103c and those landmarks each determine at least one signal characteristic indicative of the location of the device 105d such as RSSI or S/N. After determining such information, each landmark 103a, 103b, 103c transmits such information to a localization server 109. The server 109 collects the RSSI or S/N data from the plurality of landmarks and pre-processes them for the solver 110. For instance, server 109 may clean up and summarize the traffic observations received from the landmarks. The server 109 then transmits the cleaned and summarized data to the solver 110, which perform a Markov Chain Monte Carlo simulation, generate a Bayesian network, use the Bayesian network to develop a predicted location of the device. Markov Chain Monte Carlo simulations and Bayesian networks comprises merely one exemplary form of a solver for wireless device localization. Other types of algorithms could be employed in the alternative.

While the discussion above focuses on localization of a single exemplary mobile wireless device, it should be understood that the network actually typically observes signal characteristics of and predicts the locations of multiple mobile wireless devices simultaneously (which makes the necessary processing for localization substantially more complex).

Figure 2A:
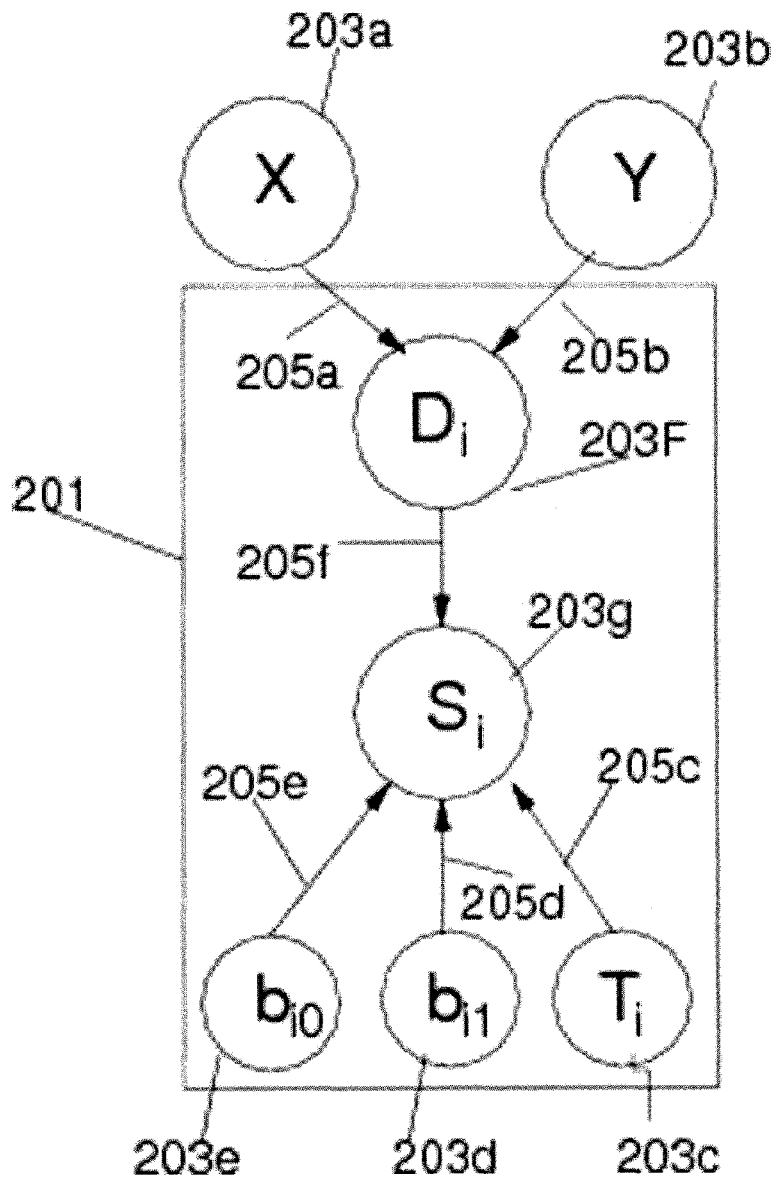
FIGS. 2A-2D are graphical models of exemplary Bayesian networks.
Figure 2B:
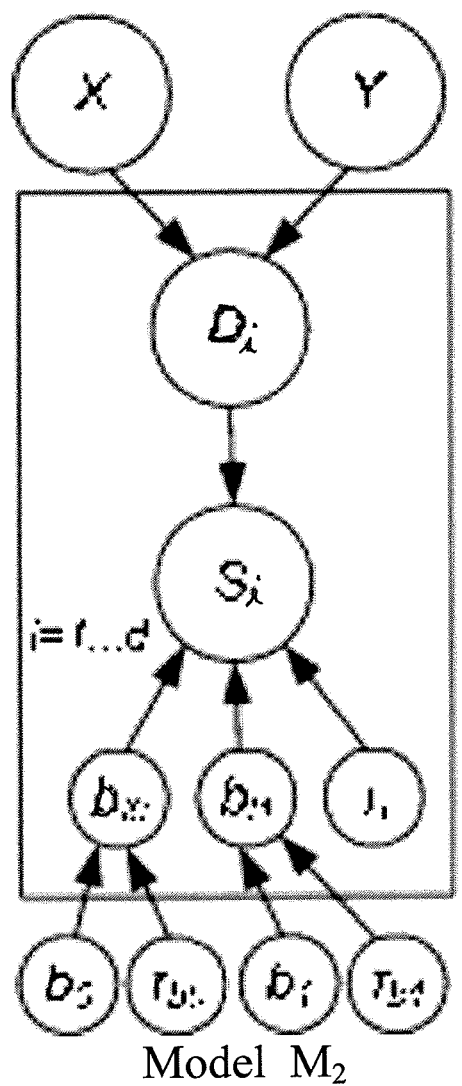
Figure 2C:
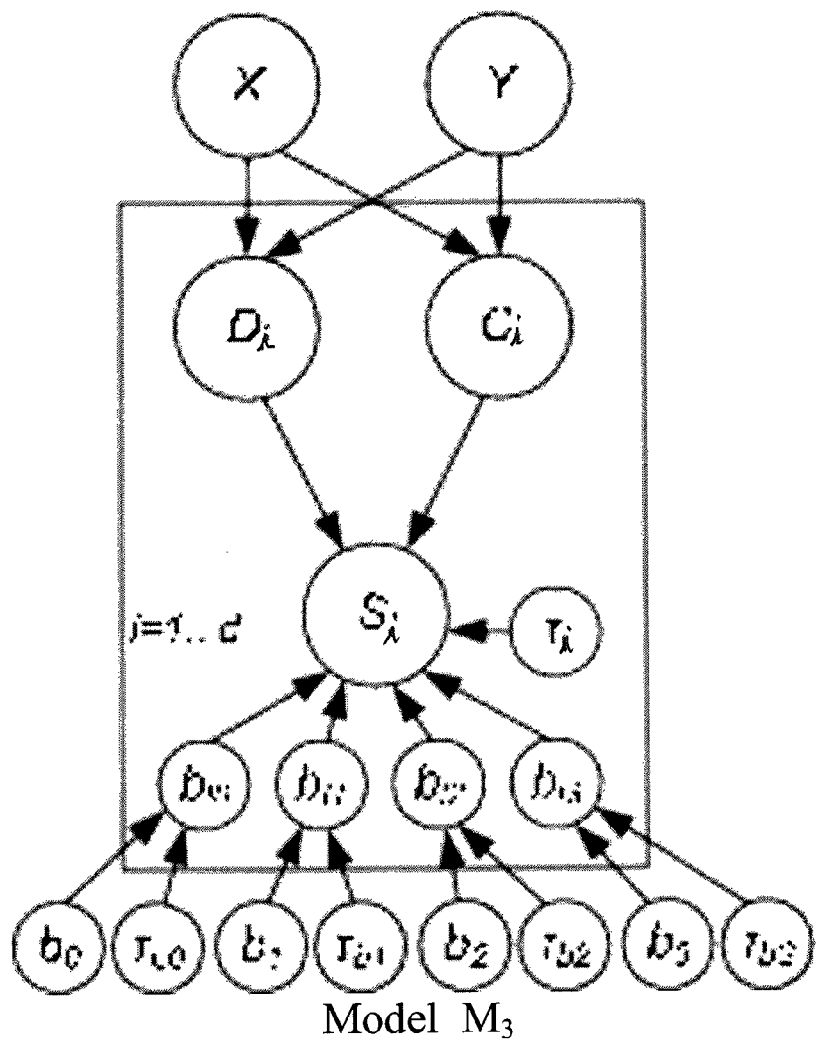
Figure 2D:
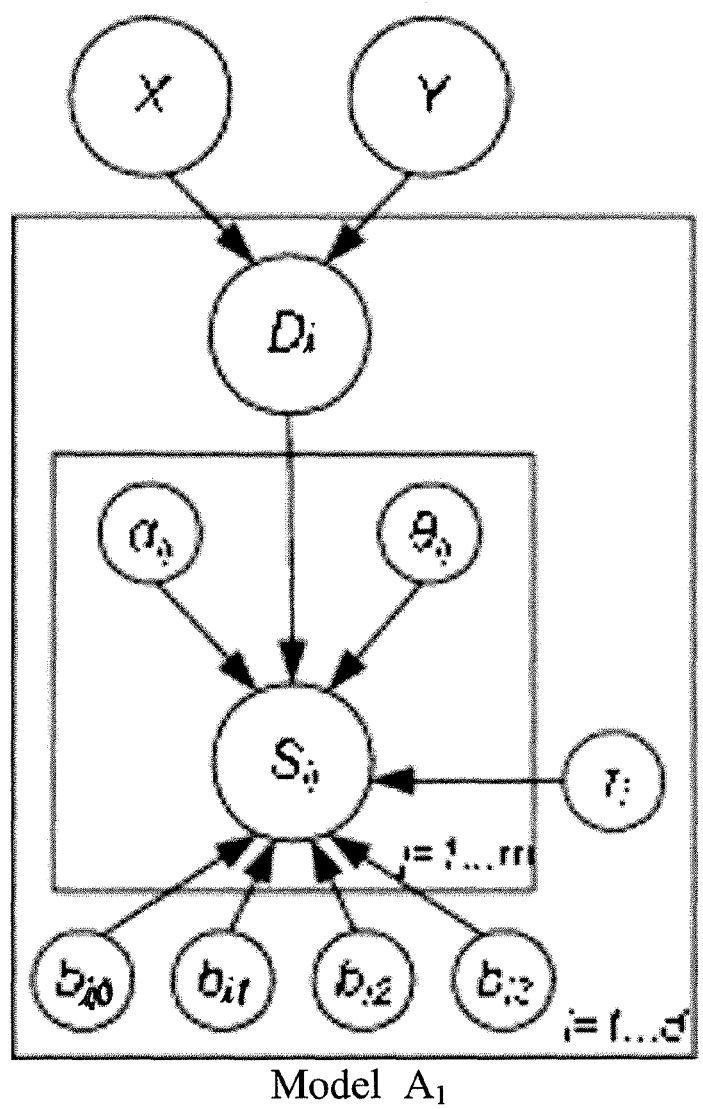

FIG. 2A is a diagrammatic representation of an exemplary Bayesian graphical network. FIG. 2A represents a five dimensional model, each circle 203a-203g enclosing one variable. Particularly, the model assumes two physical dimensions represented by the X and Y coordinates 203a, 203b (which is a common assumption when all wireless devices are known to be on a single floor of a building), two signal propagation constants, $b_{i0}$ and $b_{i1}$ 203d, 203e, and a multi-path constant, $T_i$ 203c. D represents distance and S represents a signal characteristic. The subscript i indicates the particular sample, i.e., the sample index. The arrowed lines 205a-205f are called edges. An edge represents the mathematical relationship or function between the two variables that it connects.

Thus, for instance, edge 205f represents the equation $D_i$=F (X). The box 201 encloses the variables that comprise the network while the variables outside of the box are the variables that are being solved for.

The present invention is a method and apparatus for sampling in connection with the building of Bayesian networks. The method can be implemented by any reasonable apparatus, but most likely would be implemented in the form of software running on a general purpose computer. This software would reside in the solver 110 in FIG. 1, for example. However, it should be understood that all of part of the method can be implemented in hardware, firmware, software, a digital signal processor, a microprocessor, an application specific integrated circuit (ASIC), a state machine, a programmed general purpose processor or computer, or any other reasonable apparatus for processing data.

As noted above, the present invention is a sampling technique that can be used in Markov Chain Monte Carlo sampling. Markov Chain Monte Carlo (MCMC) sampling is a statistical tool used in varied applications including, but not limited to, localization of wireless devices in a wireless network environment. The present invention will be described herein with specific reference to a wireless device localization system. However, it should be understood that the invention has broader application and that this particular application is merely exemplary. Y. Chen, J. Francisco, K. Kleisouris, H. Xue, R. Martin, E. Elnahrawy, X. Li, *GRAIL: General Real-Time Adaptable Indoor Localization*, Proceedings of the 4th International Conference on Embedded Networked Sensor Systems, Boulder, Colo., USA, 2006, Pages: 351-352, ISBN: 1-59593-343-3 fully incorporated herein by reference, describes GRAIL, which is an exemplary real time localization system for wireless networks into which the present invention can be incorporated.

Aforementioned FIG. 1 illustrates a network architecture into which the GRAIL system can be incorporated. GRAIL is built around the four logical types of objects shown in FIG. 1: namely, landmarks 103, a server 109, a solver 110, and transmitters 105. Localization using the GRAIL system thus assumes the sensor field has hierarchical access to powerful computing nodes. Specifically these objects are:

Transmitters 105. These are the devices to be localized. Any device that transmits packets can be localized, including weak sensor nodes. In the examples discussed hereinabove, for instance, they may be cellular telephones.

Landmarks 103. These gateway class nodes listen to packet traffic and know their own locations. Landmarks also summarize data before forwarding the data to the localization server. Landmarks do not need significant computing capability, but need to aggregate all observable traffic, e.g., average the RSSI over many transmission on a per-transmitter basis.

Server 109. A server is a powerful machine that collects information from the landmarks. A centralized server solution makes easier the cleaning and summarizing of the traffic observations. Second, it enables a variety of additional services such as attack detection and tracking to use the same framework.

Solvers 110. A solver takes the readings collected by the landmarks and summarized etc. by the server 109 and returns localization results.

There are several ways for a solver to solve for the location of wireless devices in a wireless network. One such way is via a Bayesian network. The present invention would reside in the solver 110 in the exemplary system of FIG. 1 and comprises a technique for Markov Chain Monte Carlo sampling for a Bayesian network. The system of FIG. 1 has the following 4 steps of localizing a wireless transmitter.

1. The sensor node 105 sends a packet. Some number of landmarks 103 observe the packet and record physical layer properties of the packet. In the example to be discussed herein below, RSSI is the primary physical layer modality. However, Angle-of-Arrival, S/N, or Time-of-Flight can be supported in the alternative or additionally.
2. The landmarks 103 forward traffic summaries, i.e., the physical layer properties observed from transmitting devices 103, to the server 109. For example, for each transmitter, the observing landmarks 110 and the history of the RSSI would be sent to the server 109.
3. The server 109 presents the solvers 110 with the necessary data for localization. Depending on the algorithm, some additional selection of the data may occur at the server 109.
4. The solver 110 determines the coordinates of each sensor node 105. In addition, the Bayesian network solver of the present invention also can return an estimation of the uncertainty in the position.

Although Bayesian networks are attractive compared to other approaches because they provide similar performance with much less training data, the computational cost of using these networks is quite large with standard statistical packages, such as WinBugs (Lunn, D. J., Thomas, A., Best, N., and Spiegelhalter, D. (2000) *WinBUGS—a Bayesian modelling framework: concepts, structure, and extensibility*. Statistics and Computing, 10:325-337). Localizing a few points can take up to 10 seconds. In addition, stock solvers do not scale well when localizing many points at once or with zero training data. In these cases, localization can take well over a minute on a well-equipped machine.

What is desirable is a method of solving Bayesian networks used for localization and other problems that is computationally efficient and simultaneously provides quick convergence. Finding such a method not only reveals how fast localization can be performed, but also the accuracy to be expected as compared to solutions provided by packages like WinBugs.

The Bayesian networks for such localization systems have no closed-form solutions and, thus, Markov Chain Monte Carlo (MCMC) simulations are used to solve these networks. This family of approaches uses statistical sampling to explore the probability density functions (PDFs) of the variables in the network. Specifically, MCMC methods within which the present invention can be employed include Gibbs sampling and Metropolis-within-Gibbs sampling. Within these variants, there is a rich diversity of approaches to sampling individual variables.

Slice sampling is the method that dominates the entire execution time in Gibbs approach to localize many points simultaneously. Specifically, the number of evaluations of the conditional posterior distribution is the prevailing factor that makes slice sampling computationally expensive. Second, using real data, it was determined the conditional posterior distributions of the coordinates of an item to be localized as well as the angle of the received signal strength are relatively flat.

To take advantage of this flatness property, the present invention implements a variation of slice sampling herein termed whole domain sampling. This method samples uniformly over the whole domain, as opposed to carefully choosing only parts of the domain to sample from. Whole domain sampling is computationally fast and simultaneously mixes rapidly, and thus provides fast convergence. Such a method requires no tuning, hence making it an attractive approach because it constitutes a "black-box" sampler for the networks. For other methods, such as Metropolis, tuning is critical to obtaining reasonable results. The flatness of the conditional posterior distributions is a key factor in determining the effectiveness of the whole domain approach.

Furthermore, in order to better understand why whole domain sampling converges faster than other methods, an analytic model was built that estimates the number of evaluations of the conditional posterior distribution under slice sampling when using: (a) a whole domain approach and (b) a step out process. This analytical model analytically determines how flat a double exponential distribution should be in order for whole domain sampling to be faster than a step out approach. Comparing the shape of that PDF to the actual PDFs in Bayesian networks shows qualitatively that these curves clearly fall in the regime where whole domain sampling is faster than a step out approach.

Bayesian networks are known as a location estimation technique. Researchers have found that signal strength information, such as RSSI, from a collection of access points can be exploited to localize simultaneously a set of terminals. Additionally, a model has been developed that provides accurate location estimates without any location information in the training data, leading to a truly adaptive zero-profiling technique. Other research has extended the field by incorporating angle-of-arrival (AoA) of the signal along with the received signal strength (RSS) for better position estimation. Such a solution reduces the size of the training examples needed to reach the same performance of Bayesian networks that rely solely on RSS.

Neal, R. M., "*Probabilistic Inference Using Markov Chain Monte Carlo Methods*" Department of Computer Science, University of Toronto, Toronto, Ontario, Canada, Tech. Rep. CRG-TR-93-1, September 1993 and Neal, R. M., "*Slice Sampling (with discussion)*", Annals of Statistics, vol. 31, pp. 705-767, 2003 provide an extensive study of methods used for probabilistic inference using MCMC methods, such as Gibbs sampling, slice sampling and the Metropolis algorithm. Also, Agrawal, D. K., Gelfand, A. E., "*Slice Gibbs Sampling For Simulation-Based Fitting Of Spatial Data Models*", Statistics and Computing, vol. 15, pp. 61-69, 2005 describes a slice Gibbs sampler, that, unlike slice sampling that slices the prior x likelihood, it slices only the likelihood.

The present invention focuses on minimizing the computational cost of MCMC methods.

A graphical model such as illustrated in FIG. 2A is a multivariate statistical model embodying a set of conditional independence relationships. Here, we focus on acyclic digraphs (ADGs). The edges 205 in the graph encode the relationships. Each vertex 203 corresponds to a random variable Xv, v∈V, taking values in a sample space Xv. To simplify notation, v will be used in place of Xv hereinafter. In an ADG, the parents of a vertex v, pa(v), are those vertices from which edges point into v. The descendants of a vertex v, pa(v), are those vertices from which edges point into v. The descendants of a vertex v are the vertices that are reachable from v along a directed path. A vertex w is a child of v if there is an edge from v to w. The parents of v are taken to be the only direct influences on v, so that v is independent of its non-descendants given its parents. This property implies a factorization of the joint density of Xv, which is denoted by p(V), given by $$p(V) = \prod_{v \in V} p(v \mid pa(v))$$

In the Bayesian framework, model parameters are random variables and, hence, appear as vertices in the graph. When some variables are discrete and others continuous, or when some of the variables are latent or have missing values, a closed-form Bayesian analysis generally does not exist. Analysis then requires either analytic approximations or some kind of simulation methods. One such simulation method is the Monte Carlo method that has been used to compute the integral of some function f(x) over some region D, by drawing independent and identically distributed (i.i.d.) random samples uniformly from D. FIG. 1 provides some intuition in this process. The curve represents the unknown probability density function (PDF) of a variable (e.g. the x-coordinate of an object to be localized). Monte Carlo sampling methods approximate the PDF by building a histogram using randomized draws. If the draws are generated by evolving a Markov chain, they are no longer independent, and the process is called Markov Chain Monte Carlo (MCMC).

Markov Chain Monte Carlo

An MCMC method starts with some initial values for each stochastic variable v (e.g. x-coordinate), and then cycles through the graph replacing the old value of each v with a new value. The new value is drawn from some distribution that depends on the MCMC method used. After sufficient iterations of the procedure, one assumes the Markov chain has reached its stationary distribution. Future simulated values are then monitored. The monitoring process may record the entire histogram, or only measure the median, mean, or the 95% interval.

Once a Markov chain has reached its stationary distribution, a delicate issue is whether the chain moves fast around the space of the conditional posterior distribution of a stochastic variable. If it does, it is said that the chain "mixes" rapidly. Intuitively, mixing describes how much of the domain is explored as a function of time.

Below is a brief overview of two exemplary MCMC methods that can be used for Bayesian inference. More details and other methods can be found in the literature.

Gibbs Sampling

A single-variable or univariate (updates one variable at a time) Gibbs sampler chooses the new value of a stochastic variable v from its conditional probability distribution, given all the other quantities, denoted V\v, fixed at their current values (known as the "full conditional"). The crucial connection between directed graphical models and Gibbs sampling lies in expression (1). The full conditional distribution for any vertex v is equal to:

$$p(v \mid V \setminus v) \propto p(v, V \setminus v)$$

$$\propto \text{terms in } p(V) \text{ containing } v = p(v \mid pa(v)) \prod_{w \in child(v)} p(w \mid pa(w))$$

i.e., a prior term and a set of likelihood terms, one for each child of v. Thus, when sampling from the full conditional for v, one need consider only vertices that are parents, children, or parents of children of v to perform local computations.

Conjugate Sampling

In many applications, full conditional densities can be expressed in a closed form (conjugate). Thus, drawing samples from it can be done using standard algorithms. For instance, the full conditional could be a normal or a gamma distribution from which sampling is straightforward.

Slice Sampling

In Bayesian networks representing typical wireless device localization scenarios, some full conditionals are complex and unavailable in closed form. For instance, one cannot directly compute the PDF of a variable that represents the x-coordinate of a point to be localized. In these situations, slice sampling can be used, which is a general process that works to estimate arbitrary distributions.

Figure 3:
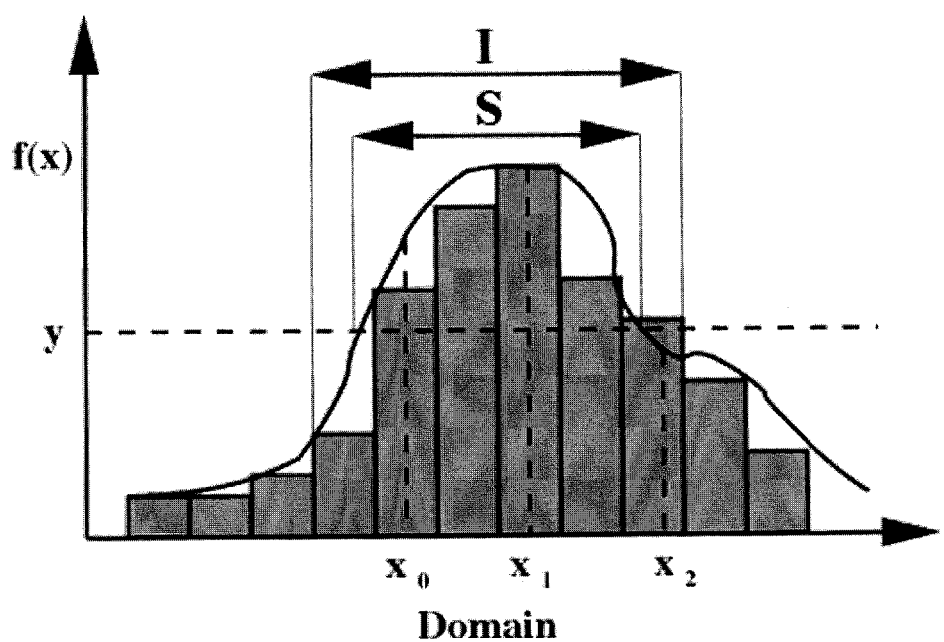
FIG. 3 is a graphical representation of a probability density function.

With reference to FIG. 3, which is a probability density function of y as a function of x, i.e., $y=f(x)$, suppose $f(x)$ is the full conditional density of a variable, x. An issue in Gibbs sampling is that each time the value of one variable changes, the underlying f for that instance of the network also changes. Thus, the true joint-density of a variable cannot be computed by simply running through the domain in small increments and building the curve directly, because the curve will change when the value of another variable is changed.

Slice sampling follows a strategy of drawing randomized values of f(x) for each variable, following a procedure to pick randomized values in the domain in a way such that the number of times these occur (or fall into specific discrete ranges) will approximate the PDF of the full conditional.

For an initial value $x_o$ for the variable x, then the method uses an auxiliary variable $y=k\ f(x_0)$, where k is uniformly distributed in (0, 1), to define a slice S, such that $S=\{x: y<f(x)\}$ (see FIG. 3). Assuming S is known, then one would like to pick a new value, $x_1$, uniformly across the domain defined by the slice. However, the edges of S are not necessarily easily estimated, and so it must be approximated with an interval I.

Several schemes are possible in order to find I:

If the range of the variable is bounded, I can be the whole range. Thus, there is no computational cost for I. This approach is herein termed Whole Domain Sampling and it is the approach of the present invention.

Alternately, one can start with an initial guess w of S that contains the current value of the variable, and then perhaps expand it by a "stepping out" process. The process expands w in steps of size w until both ends are outside the slice or a predetermined limit is reached. For example, in FIG. 1, if w is equal to the width of a bar in the histogram, I might by off from S by at most one w on each side.

As another alternative, given a guess w of S, w can be expanded following a "doubling out" procedure. Doubling produces a sequence of intervals, each twice the size of the previous one, until an interval is found with both ends outside the slice or a predetermined limit is reached. The concept behind this approach is that finding the edges of S should be much faster even though some precision is lost.

Both "step out" and "double out" start by positioning the estimate w randomly around the current value $x_0$. The predetermined limit that may apply to terminate the expansion of w is an interval of size mw, for some specified integer m.

Once an interval I has been found, "step out" follows a shrinkage procedure that samples uniformly from an interval that is initially equal to I and which shrinks each time a point is drawn that is not in $S \cap I$ (e.g. point $x_2$ in FIG. 3 where $f(x_2)<y$). A point picked that is outside $S \cap I$ is used to shrink I in such a way that the current point $x_0$ remains within it. "Double out" follows the same shrinkage process with some additional constraints for the point that is finally accepted. Depending on the shape of f(x), and the quality of I's approximation of S, many draws of x may be rejected.

In practice, to avoid possible problems with floating-point underflow, it is safer to compute $g(x)=-\ln(f(x))$ rather than f(x) itself, and thus $S=\{x: g(x)<-\ln(k)+g(x0)\}$. g(x) is herein termed "minus log the full conditional density".

Metropolis Algorithm

A univariate Metropolis algorithm is an MCMC method that chooses the next value of a stochastic variable v by first sampling a candidate point y from a proposal distribution q. Practically, q is used to propose a random "unbiased perturbation" of the current value of v. For example, q could be a normal distribution with a mean current value of v and a user defined variance. It then computes the "gain" in an objective function resulting from this perturbation. A random number U uniformly distributed in (0, 1), is generated and the candidate point y is accepted if ln(U) is smaller than or equal to the "gain". Otherwise, it is rejected and v retains its current value. Heuristically, the Metropolis algorithm is constructed based on a "trial-and-error" strategy. In this work, one selects as an objective function minus log the full conditional g of v and, thus, measures the "gain" as $\Delta g=g(v)-g(y)$.

Gibbs sampling can be seen as a special case of the Metropolis algorithm, since the proposal function for Gibbs is the full conditional of a node and the acceptance function is always one (the candidate point y in Gibbs sampling is always accepted). Finally, in some embodiments, the Metropolis algorithm can be used for some nodes of a network and Gibbs sampling can be used for the remaining nodes. This is herein called Metropolis-within-Gibbs sampling.

Localization Models

FIGS. 2A-2D present a series of Bayesian network models of increasing complexity that embody extant knowledge about Wi-Fi signals as well as physical constraints. The models are called M1, M2, M3 and A1. Each rectangle is a "plate", and shows a part of the network that is repeated. The nodes in each plate are repeated for each of the d access points (or landmarks).

The vertices X and Y represent location, while vertex $D_i$ represents the Euclidean distance between the location specified by (X,Y) and the ith access point. X and Y are bounded by the length L and the breadth B, respectively of the wireless network coverage area (or a particular building employing wireless device localization). The vertex Si (M1, M2, M3) represents the signal strength measured at (X,Y) with respect to the ith access point. Model A1 of FIG. 2D differs from the other models in that it incorporates both the knowledge of angle-of-arrival of the signal (AoA) and the knowledge of received signal strength (RSS). In A1, there are m signal strength readings at a particular location (X,Y) with respect to the ith access point. Each is measured when the rotational directional antenna of the access point is at an angle $\theta_{ij}$ and the signal is received by the mobile at an angle $a_{ij}$. The ratio 360/m is called granularity G and is the angle interval, in a rotation of the antenna, at which the signal strengths are measured. All models reflect the fact that signal strength decays approximately linearly with log distance.

Flowchart

In short, algorithms in accordance with the present invention save significant processing overhead by substantially reducing the number of times that the value of the probability density function (or a function that is directly proportional to the probability distribution) (hereinafter collectively "density function") has to be calculated to generate a Bayesian network. Particularly, in the prior art, the value of g(X) had to be performed repeatedly for every instance of the network in order to determine an interval S or I (FIG. 1) in which a sample would be taken.

In the present invention, no interval is determined. Instead, a random value $X_0$ (or value set if more than one variable) is taken anywhere within the whole domain of the variable(s) X and the value of the density function, g, for that value of X is calculated, i.e., $g(X_0)$.

Figure 4:
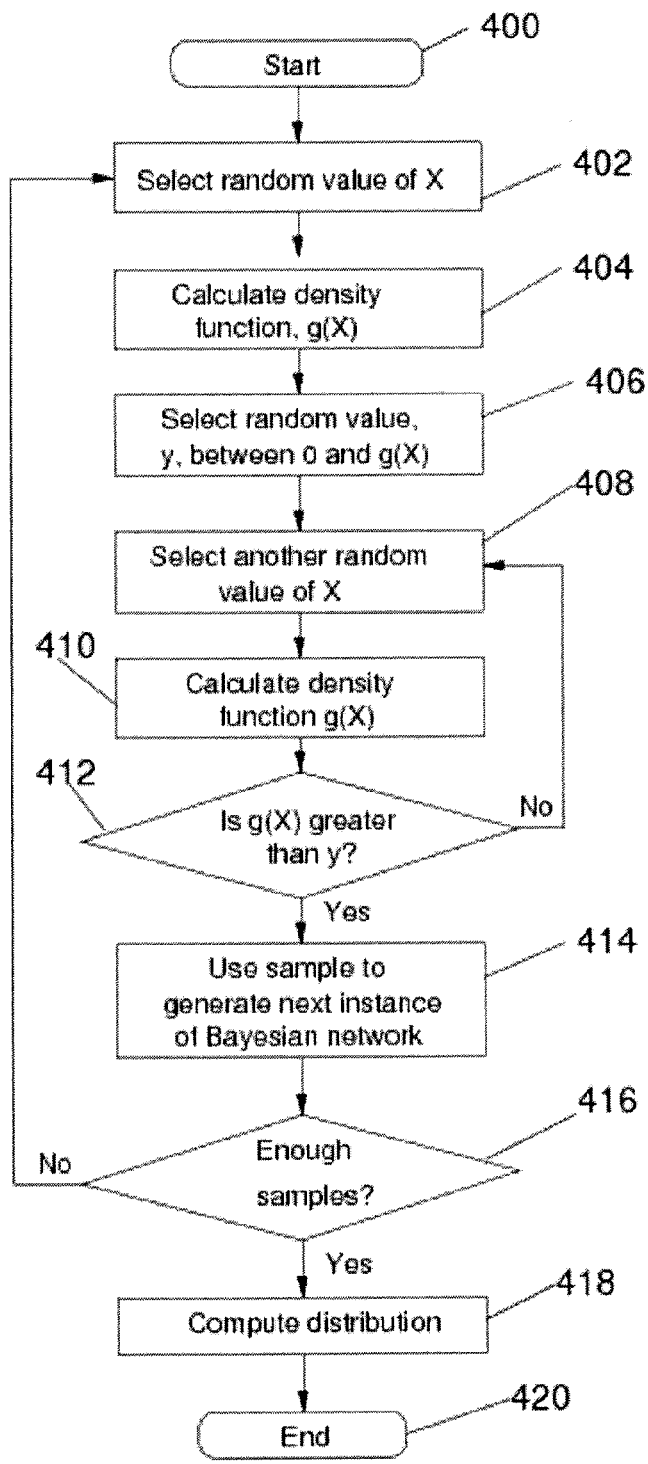
FIG. 4 is a flowchart illustrating the basic steps in accordance with one particular embodiment of the invention.

FIG. 4 is a flowchart illustrating the basic steps in accordance with one particular embodiment of the invention. The process commences at 400. In step 402, a random value $X_0$ (or value set if more than one variable or a single value if doing them in turn) is taken anywhere within the whole domain of the variable(s) X. In step 404, the value of the density function, g, for that value of X is calculated, i.e., $g(X_0)$. In step 406, a random value y between 0 and the value of the density function for $X_0$, $g(X_0)$, is selected. Next, in step 408, another random value $X_1$ of the variable(s) X over the whole domain of X is taken. In step 410, the value of the density function for value $X_1$ is calculated, i.e., $g(X_1)$. In step 412, it is determined if the value of the density function for $X_1$ is greater than y. If so, flow proceeds to step 414, in which the sample is used to build the next instance of the Bayesian network. If not, the sample is discarded and flow proceeds back to step 408, where another sample of X, e.g., $X_2$, is taken. Steps 408, 410, and 412 are repeated until $g(X_i)$ yields a value greater than y (so that flow can proceed from step 412 to step 414, in which a next instance of the Bayesian network is built with the sample. Next, in decision step 416, it is determined if enough samples have been collected to accurately calculate a distribution. This determination may be based strictly on the number of samples reaching a predetermined number, as is common. However, it also may be based on some calculation indicative of whether the density function has reached a substantially stationary distribution. In any event, if more samples must be collected, flow returns to step 402 to start the process for the next sample. On the other hand, if enough samples have been collected, flow proceeds to step 418, in which the distribution is calculated. The process ends at step 420.

When flow returns from step 416 to step 402, another value of X can be selected at random. However, in order to save even further processing overhead by further reducing the number of times $g(X_i)$ must be calculated, any one of the previous samples selected in step 408 (whether they were used or discarded) can be used as the "random" value of X for the generation of the next instance of the network. This saves computational overhead because the value of the distribution function g(X) for that value of X was already calculated previously and can simply be re-used.

Experimental Results

This section presents results of experiments performed on a Pentium 4 PC with a 2.80 GHz CPU, 1 GB of RAM running Microsoft Windows XP. The software was implemented in ANSI C. All of the networks use training data in the learning process that maps signals to locations (M1, M2, M3, A1) and also to angles (A1). For M1, M2, M3, we used the BR dataset from Madigan, E., Elnahrawy, E., Martin, R. P., Ju, W., Krishnan, P., and Krishnakumar, A., "*Bayesian indoor positioning systems*", INFOCOM, 2005, that contains 253 training points, was collected in a building that measures 255 ft×144 ft, and has 5 access points. For A1, we used a dataset from Eiman Elnahrawy, John Austin-Francisco and Richard P. Martin, "Adding Angle of Arrival Modality to Basic RSS Location Management Techniques". To Appear in Proceedings of IEEE International Symposium on Wireless Pervasive Computing (ISWPC '07), Puerto Rico, February, 2007, consisting of 20 points that were collected in a building that measures 200 ft×80 ft and has 4 access points.

Profiling a Gibbs Sampler

A Gibbs sampler was implemented first for all the exemplary networks of FIGS. 2A-2D. The sampler uses slice sampling for the variables X, Y (M1, M2, M3, A1) and $\alpha_{ij}$ (A1). All the other stochastic quantities are sampled using either a conjugate normal or a conjugate gamma method. The solvers were implemented in such a way so that the values of deterministic nodes (nodes that are a logical function of other nodes in the network) that do not change in every iteration are calculated only once in the whole sampling process. Examples of such cases are the values of nodes $D_i$ and $C_i$ for the observable data.

FIGS. 5A-5H show the breakdown of the average execution times of Gibbs sampling when slice sampling uses step out (FIGS. 5A, 5B, 5E, and 5F) and the whole domain (FIGS. 5C, 5D, 5G, and 5H). The top row (FIGS. 5A-5D) is expressed in terms of absolute time, whereas the bottom row (FIGS. E-5H) is expressed as a percentage of the whole time.

Figure 5A:
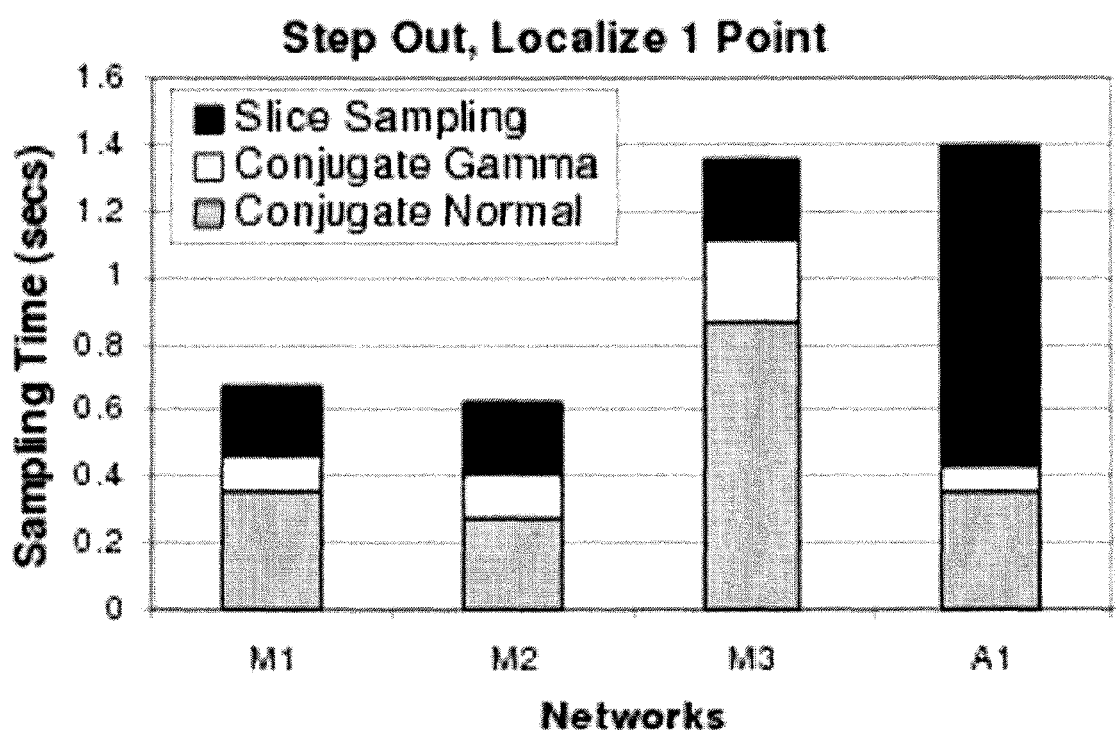
FIGS. 5A-5H are graphs showing the average execution times of Gibbs sampling under different conditions.
Figure 5B:
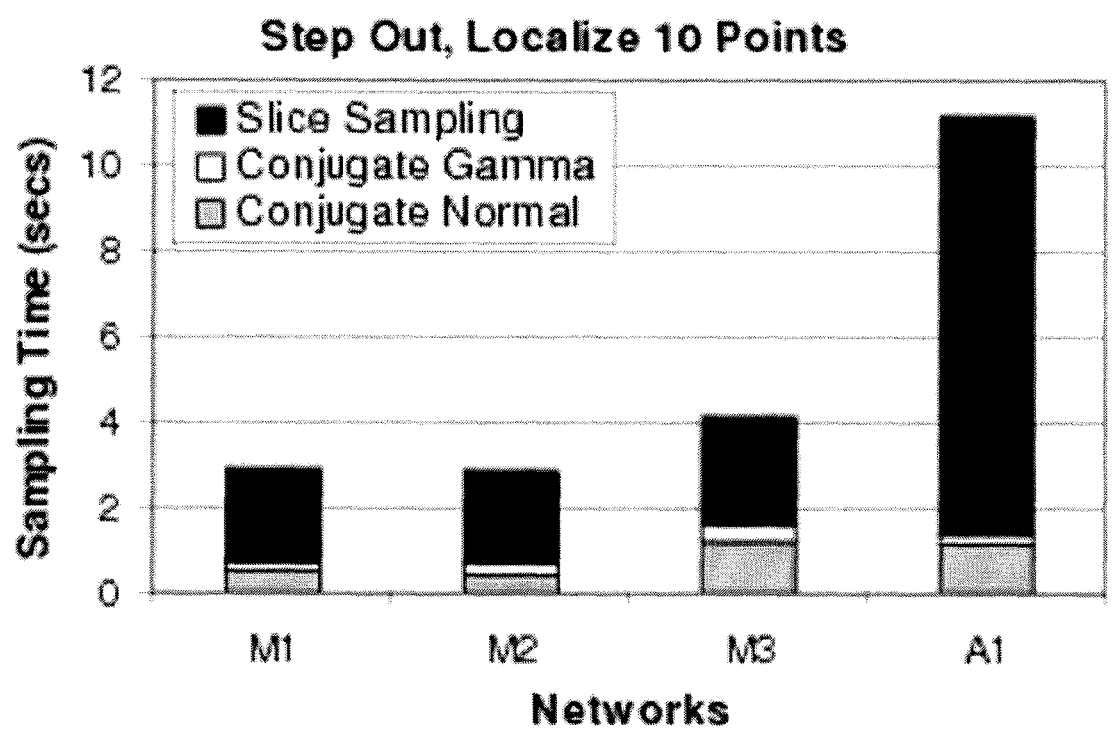
Figure 5C:
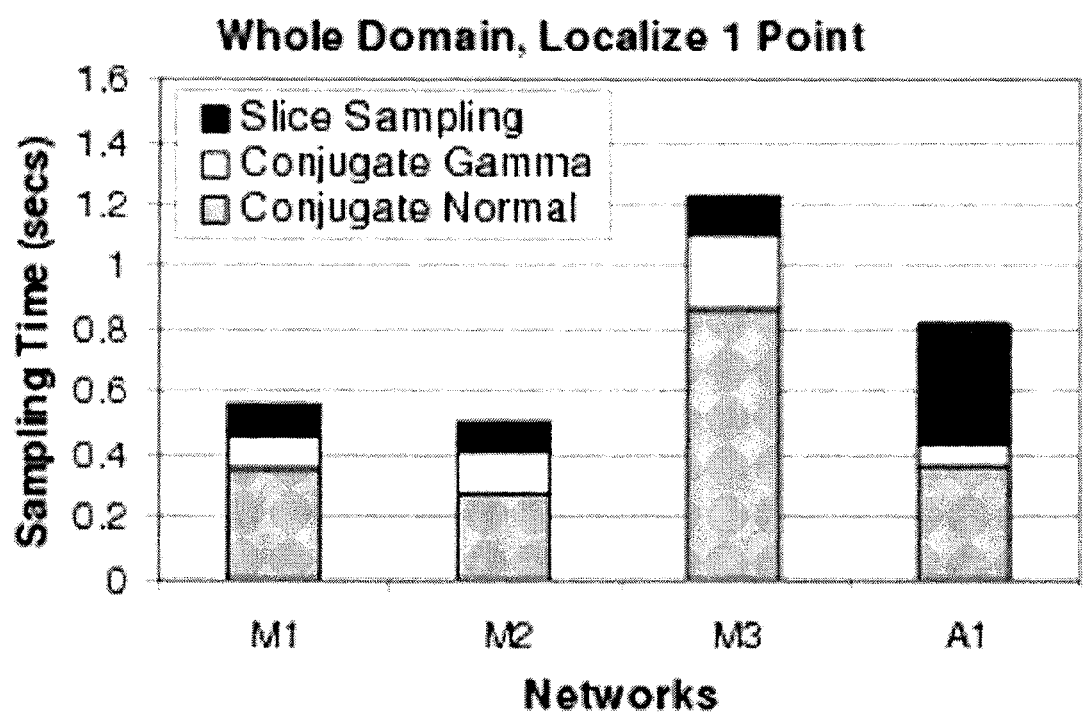
Figure 5D:
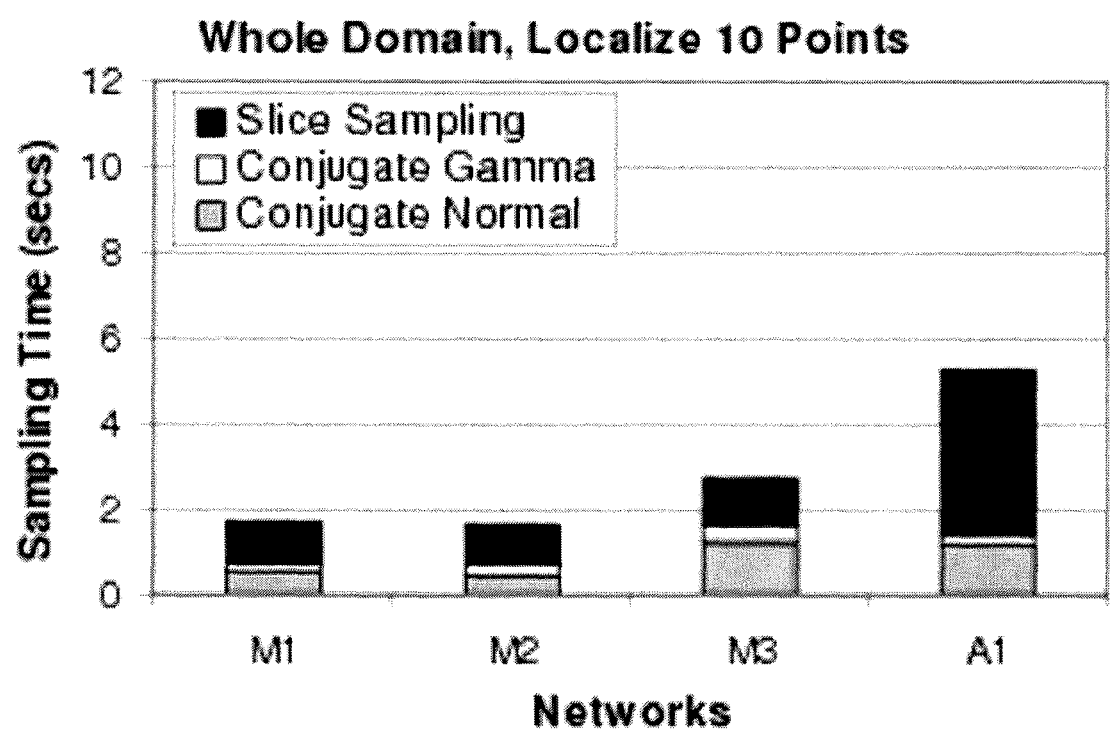
Figure 5E:
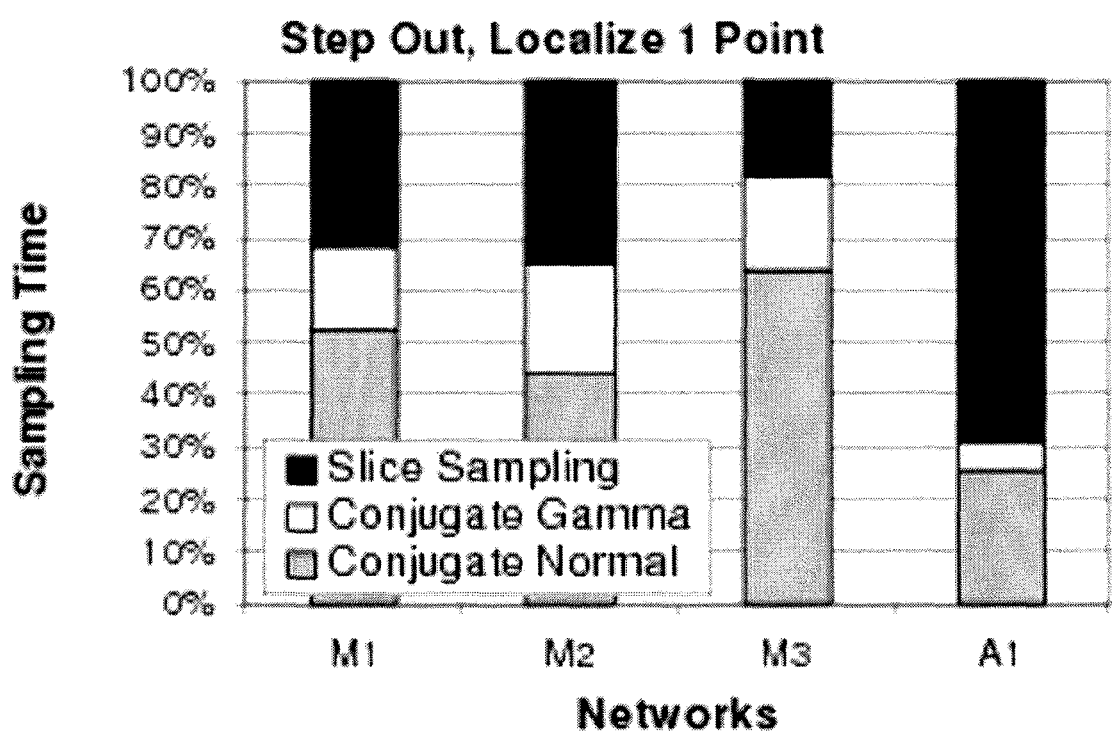
Figure 5F:
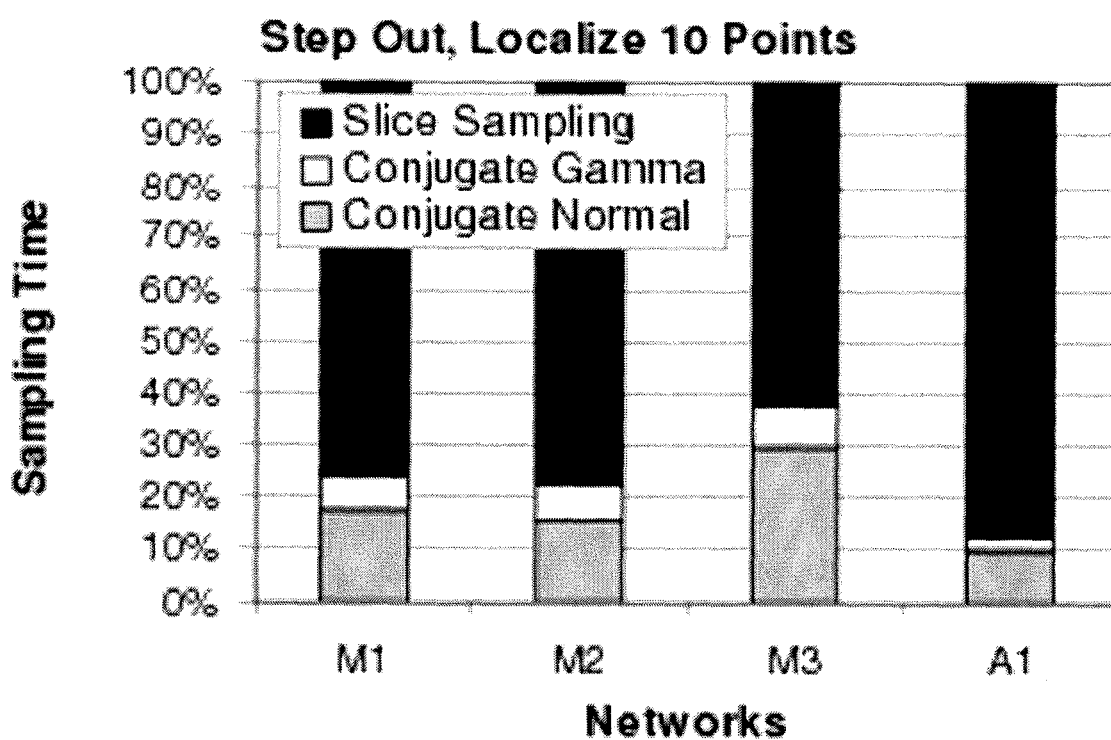
Figure 5G:
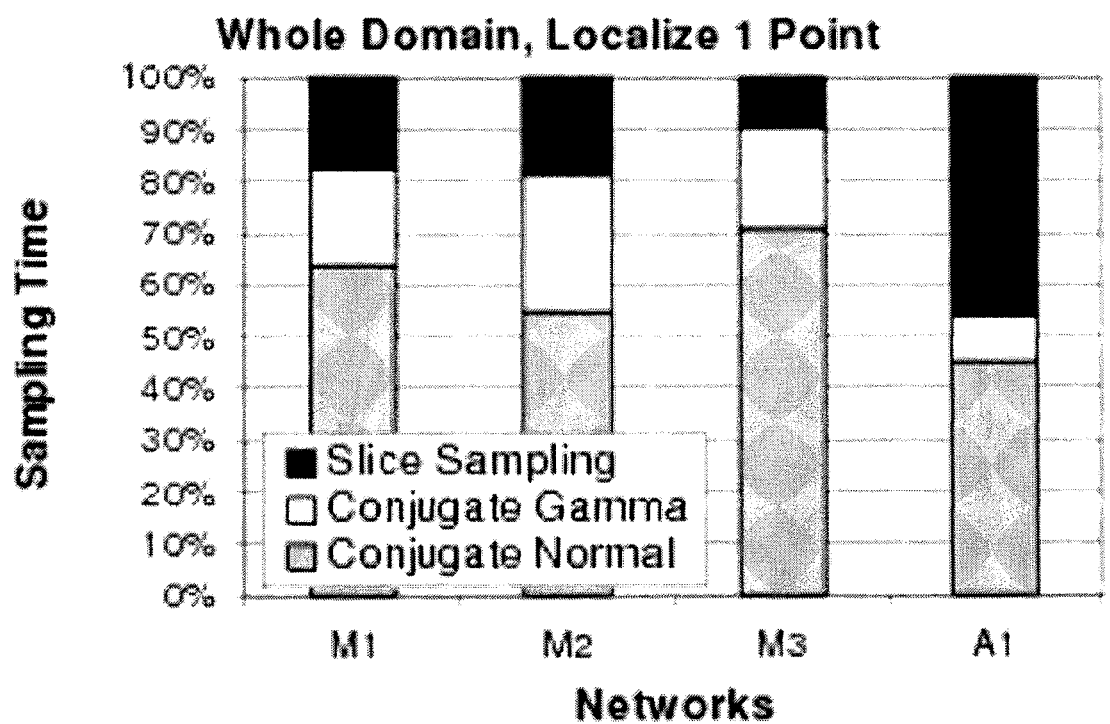
Figure 5H:
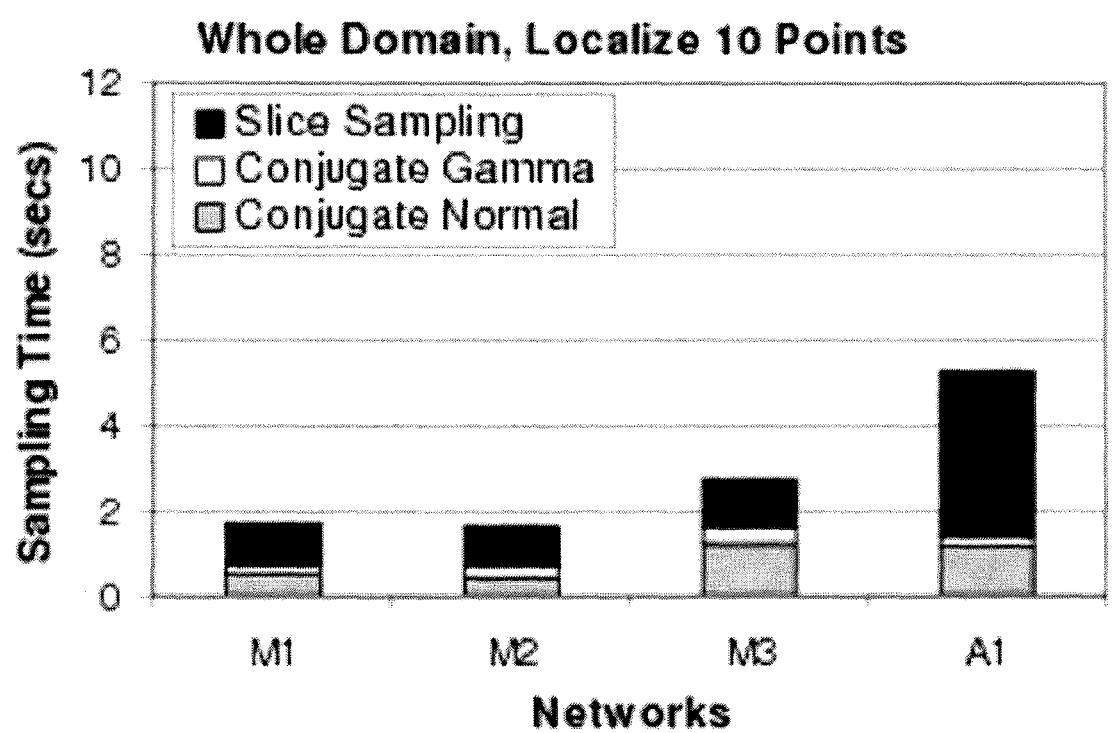
Figure 6A:
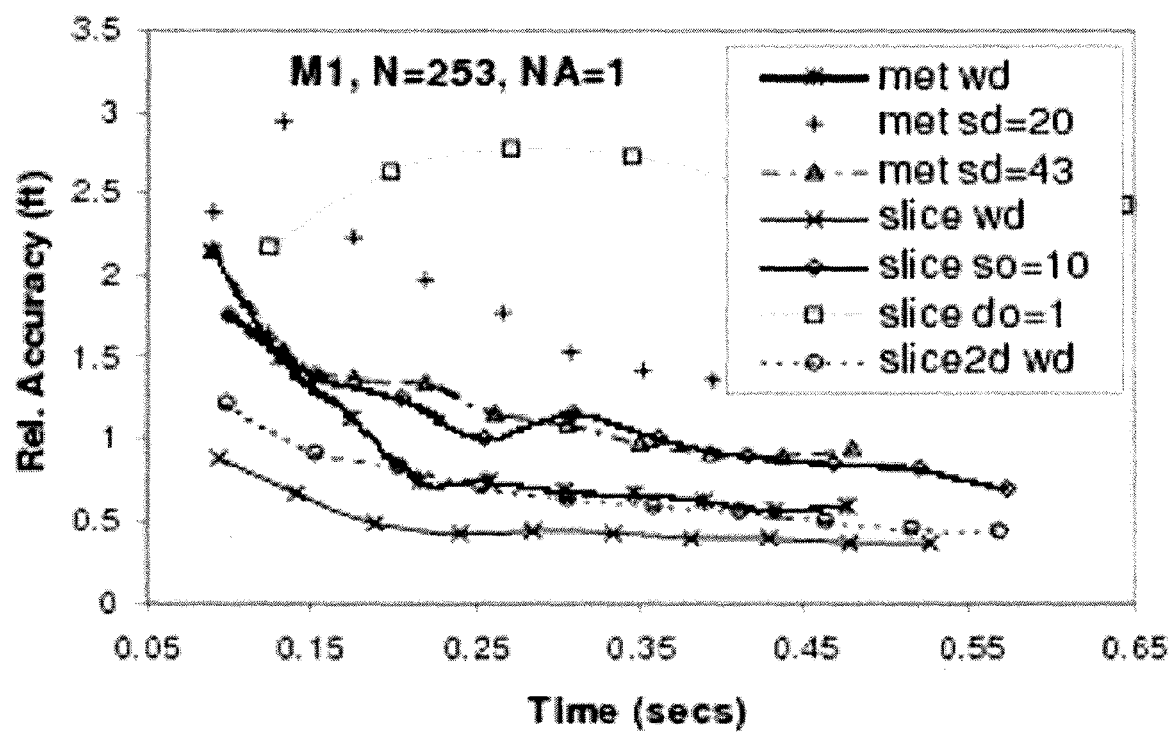
FIGS. 6A-6I are graphs showing the average performance achieved by various algorithms expressed as relative accuracy and standard deviation vs. time.
Figure 6B:
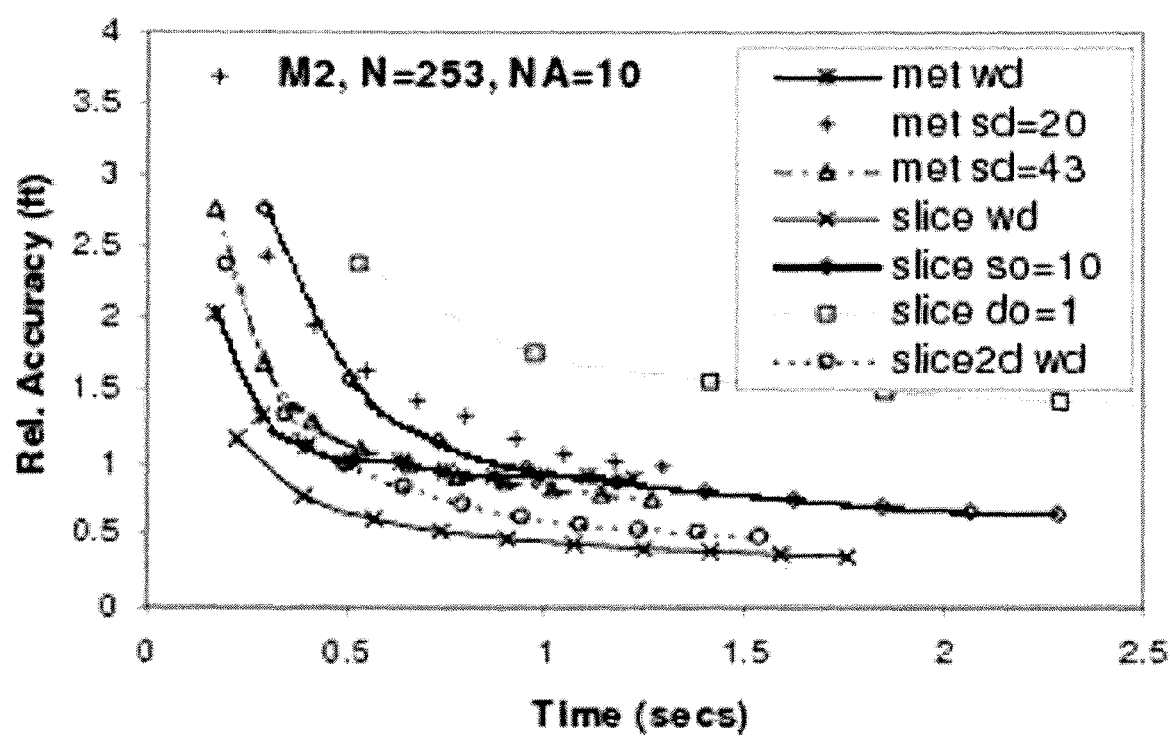
Figure 6C:
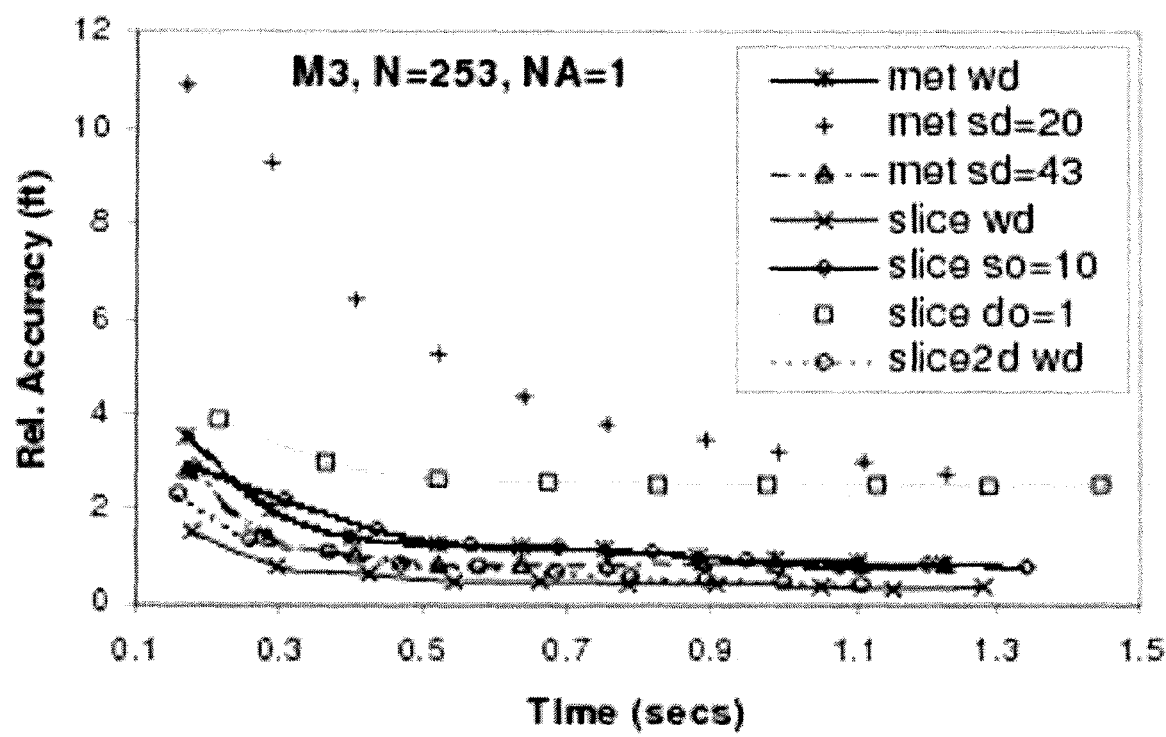
Figure 6D:
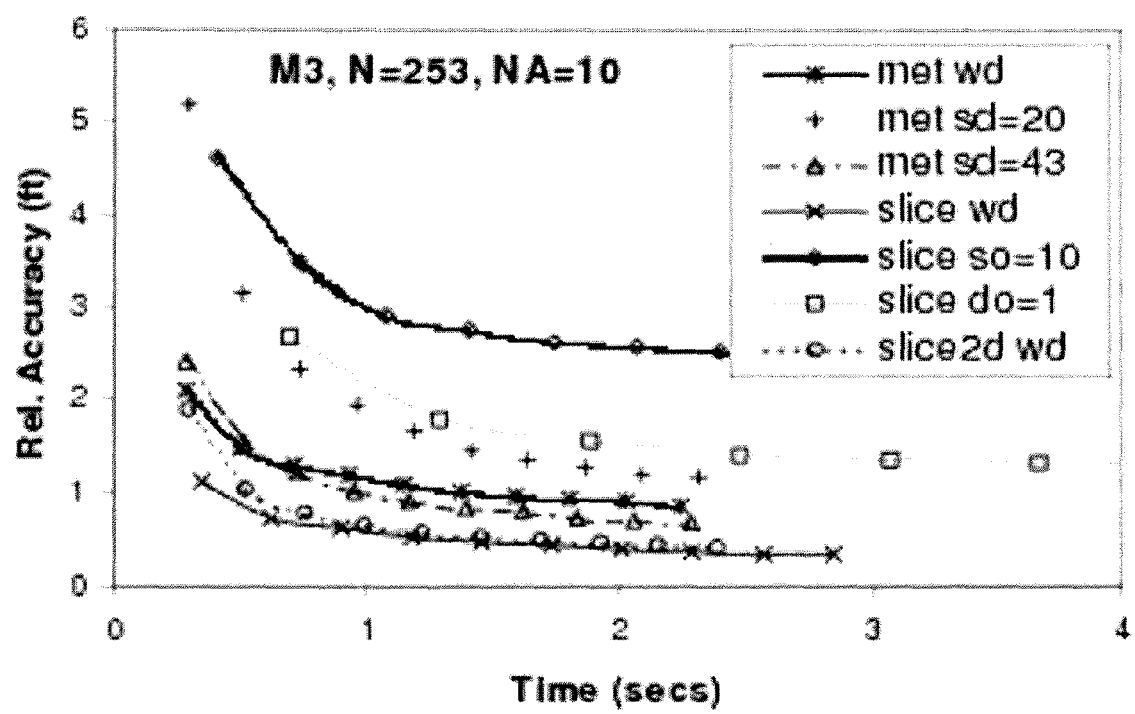
Figure 6E:
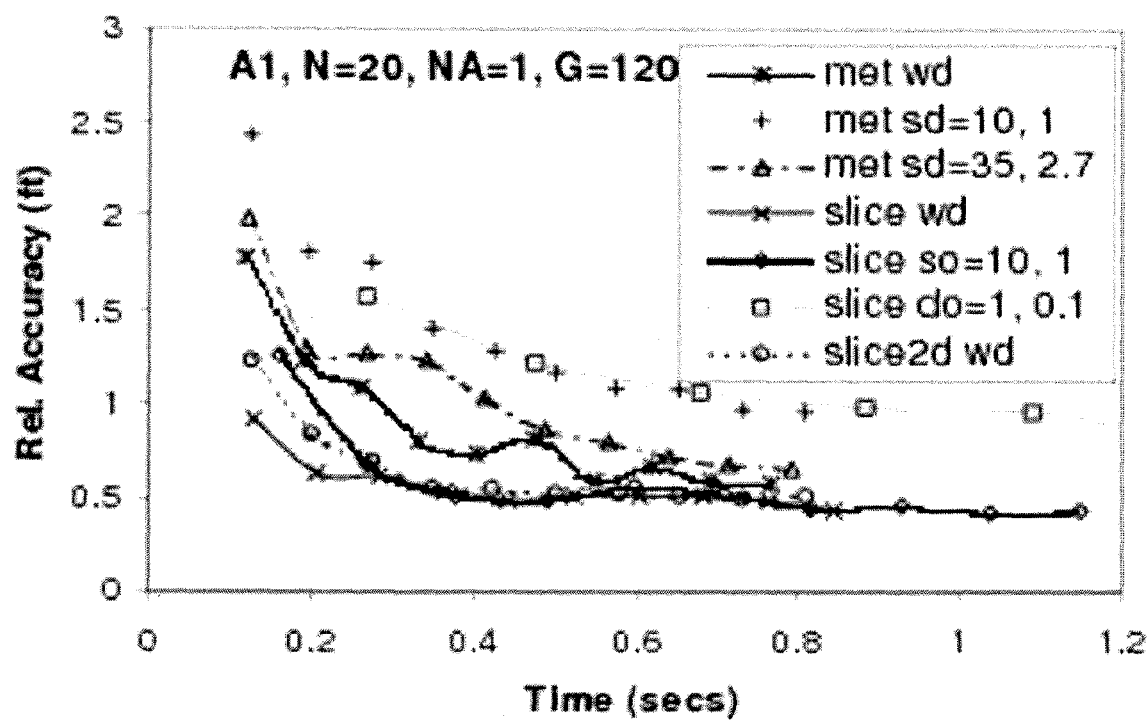
Figure 6F:
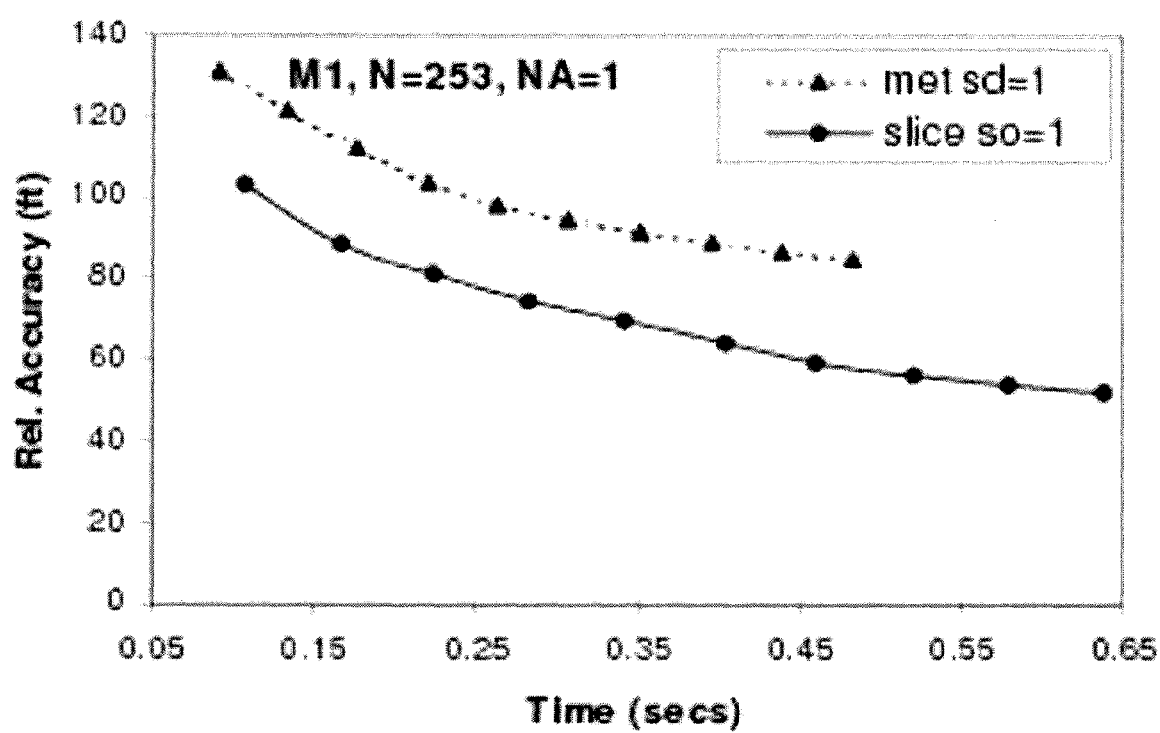
Figure 6G:
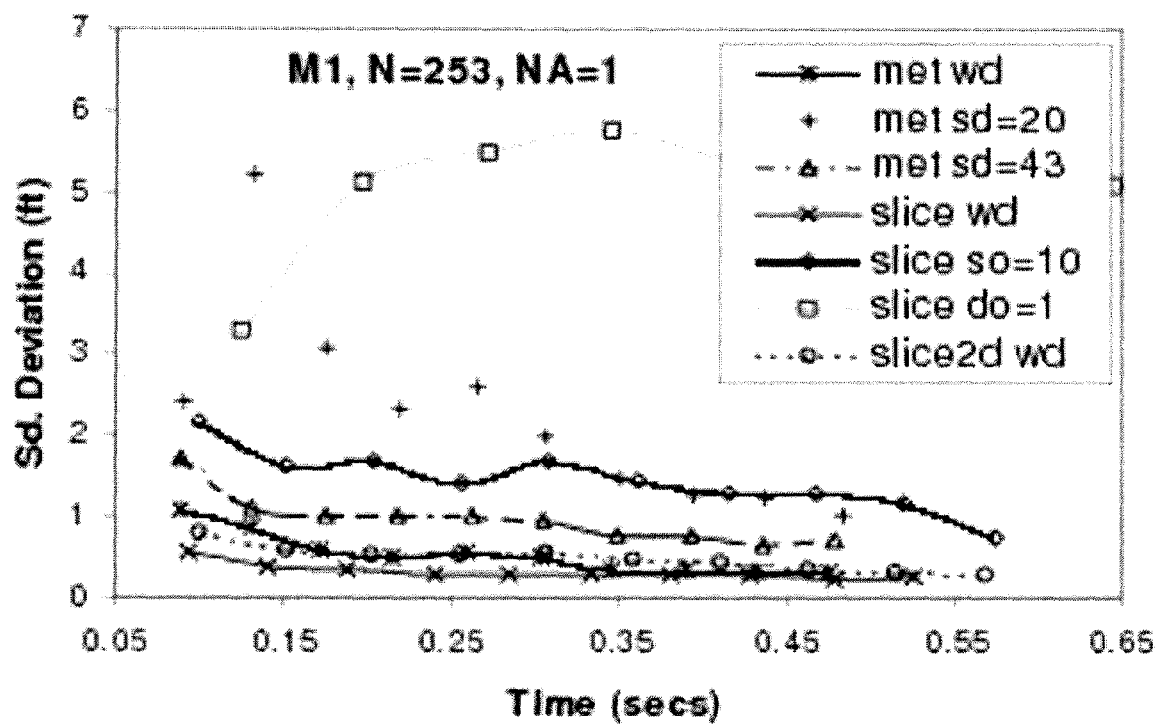
Figure 6H:
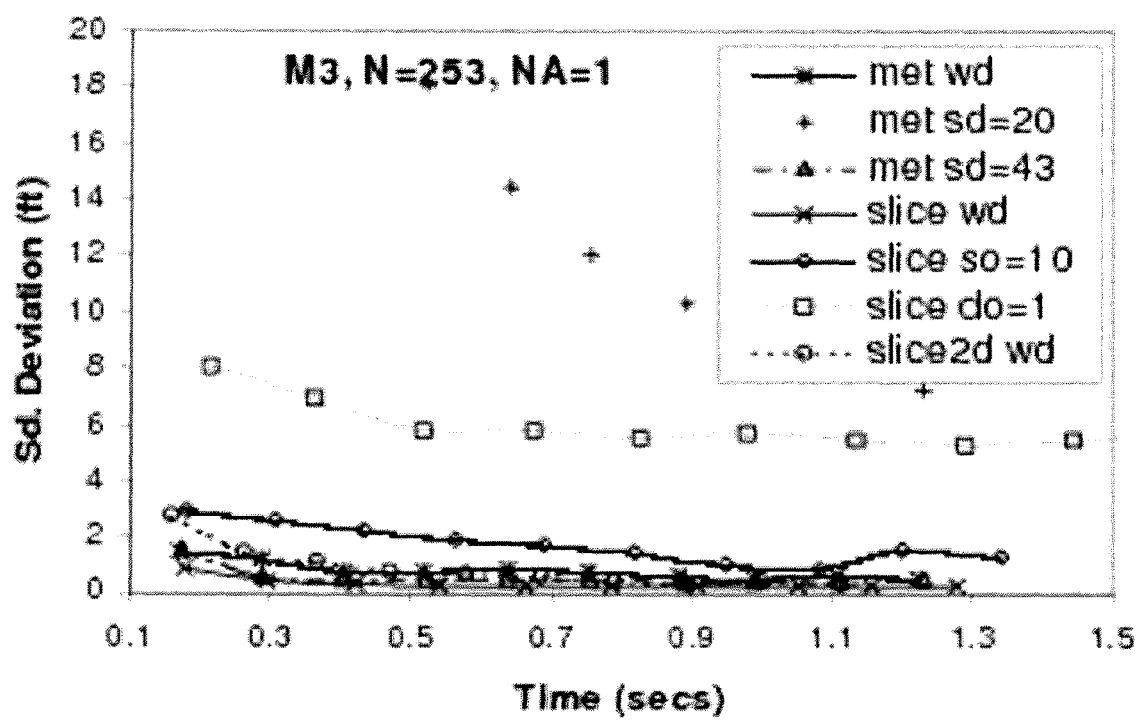
Figure 6I:
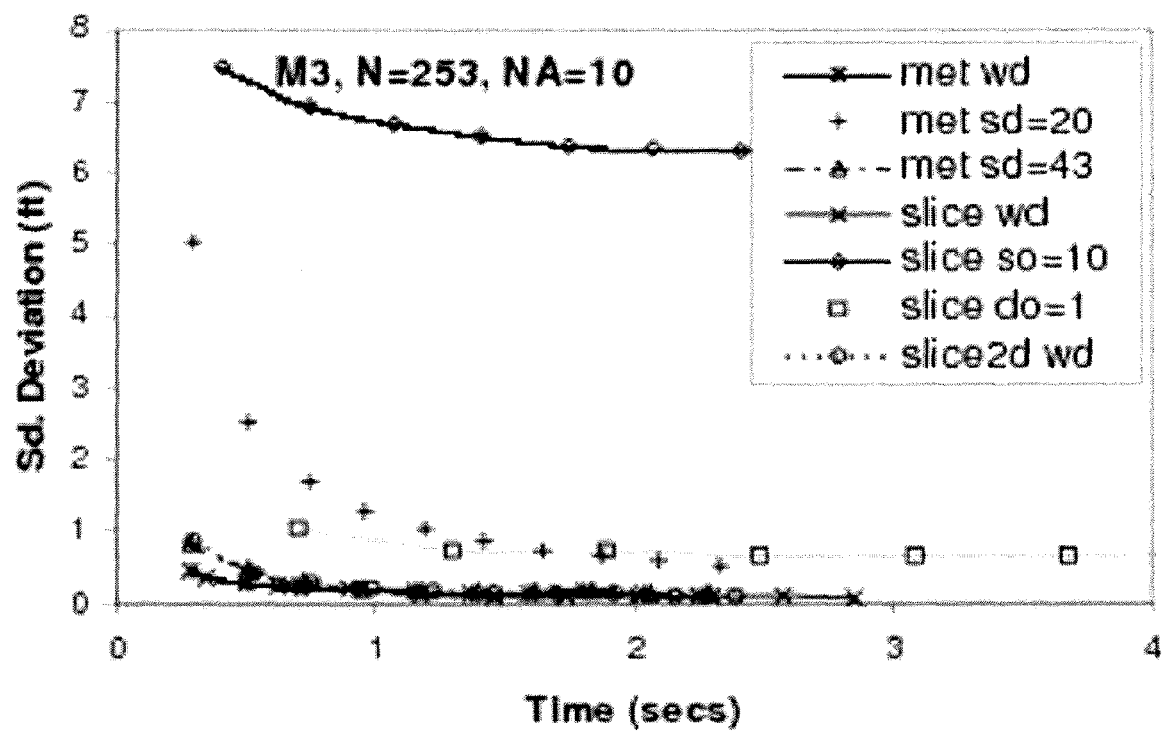

FIGS. 5A and 5B depict the average execution time breakdown (over 30 runs) of Gibbs sampling for the four networks of FIGS. 2A-2D, when the slice sampling method applies step out with w=1 ft and m=10 (mw is used as a limit to terminate the step out process; see slice sampling description). For network A1 of FIG. 2D, the value of granularity is G=120.

One can see that, as the number of points one tries to localize increases from 1 (FIGS. 5A and 5E) to 10 (FIGS. 5D and 5F), slice sampling dominates the total time of the sampler. There also is an increase on the time of the conjugate methods because, when there are 10 points to localize, there are more deterministic nodes corresponding to non-observables whose values need to be estimated in every iteration. The reason that slice sampling takes so much time in network A1 is that it is used not only to estimate X and Y, but also to estimate the angle, $\alpha_{ij}$.

MCMC Algorithms

To speed slice sampling, several variations were tried. Metropolis-within-Gibbs sampling also was implemented. Table I below summarizes the MCMC methods used for Bayesian inference on the networks. It can be categorized into Metropolis-within-Gibbs sampling (met algorithms) and Gibbs sampling (slice algorithms). The Metropolis-within-Gibbs samplers apply the Metropolis algorithm for X, Y, $a_{ij}$ and conjugate sampling for the remaining stochastic quantities. For the experiments, two forms for the proposal distribution of the Metropolis algorithm were used; namely, a uniform distribution over the whole domain of the variables X, Y, $a_{ij}$, since these variables are bounded with domain (0 . . . L), (0 . . . B) and (0 . . . 2π) respectively, and also a Gaussian centered on the current value and standard deviation k for X, Y and I for $a_{ij}$. On the other hand, Gibbs samplers apply slice sampling for X, Y, $a_{ij}$ and conjugate sampling for the other variables. Four types of slice sampling were implemented including, univariate slice sampling by: (a) sampling uniformly over the whole domain of X, Y, $a_{ij}$, (b) doing step out, (c) doing double out. For the latter two cases, we used w=kft for X and Y, w=l radians for $a_{ij}$ and m=10 to terminate the expanding process. Finally, two-dimensional slice sampling (multivariate approach) was implemented that updates X and Y simultaneously and samples uniformly over the domain of X and Y, while for $a_{ij}$ it follows univariate slice sampling over the whole domain.

TABLE I

All algorithms.

| Algorithm | Description |
|---|---|
| met wd | Univariate Metropolis with proposal uniform over the whole domain of X, Y (uniform over the whole domain for angle) |
| met sd = k (or sd = k, l) | Univariate Metropolis with proposal Gaussian whose standard deviation is k and mean the current value (the standard deviation is l for angle). |
| slice wd | Univariate slice sampling over the whole domain of X, Y (univariate slice sampling over the whole domain for angle). |
| slice so = k (or so = k, l) | Univariate slice sampling for X, Y by doing step out with w = k and m = 10 (w = l for angle). |
| slice do = k (or do = k, l) | Univariate slice sampling for X, Y by doing double out with w = k and m = 10 (w = l for angle). |
| slice2d wd | Two-dimensional (X and Y are updated together) slice sampling over the whole domain of X, Y (univariate slice sampling over the whole domain for angle). |

The text in the parentheses refers to A1

Comparing Algorithms

FIGS. 6A-6I present the average performance achieved by the algorithms in accordance with the present invention expressed as relative accuracy and standard deviation vs. time. Relative accuracy is herein deemed to be the Euclidean distance of the results of the solver compared to the ones from WinBugs after running WinBugs for 10000 iterations as burn-in, 100000 additional and having the over relax option set. The samples of the burn-in iterations are discarded and do not count in the estimation of analytic summaries for the stochastic quantities. The idea here is that the per-variable statistics of long runs of a well-tested, widely-used solver should converge to the true distribution as defined by the combination of the model and data. All the results are thus compared against this standard, as opposed to "ground truth" accuracy of the true location of the object.

The solvers were run with 100 iterations as burn-in and the additional ranged from 1000 to 10000 with increments of 1000. In each case, the results are the average of 30 runs. Univariate slice sampling over the whole domain ("slice wd" in the graphs) has the best ratio of relative accuracy vs. time for all networks. Specifically, it can localize 1 or 10 points with relative accuracy less than 1 ft in less than half a second. Moreover, "met sd=1" and "slice so=1" have the worst performance, since they converge very slowly to the WinBugs solution as can be seen from FIG. 6F. Hence, they fail to mix rapidly. Among the remaining algorithms, "slice do=1", "met sd=20" and "slice so=10" are not stable in providing a solution, as indicated by their standard deviation in FIGS. 6G, 6H, and 6I that needs more than 10000 iterations in order for its value to become small.

Figure 7:
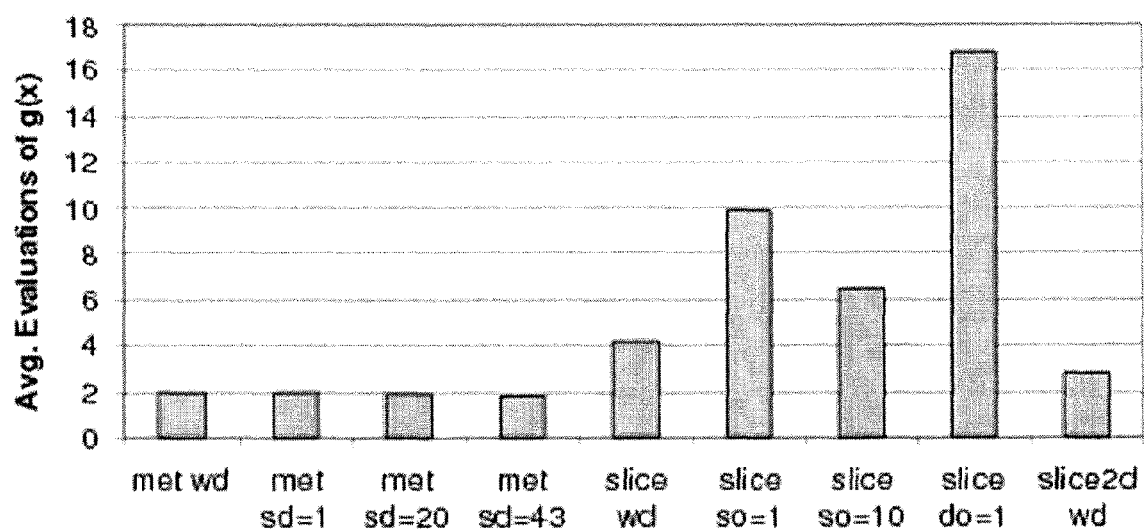
FIG. 7 is a graph showing the average number of evaluations per variable X and Y under exemplary conditions.

Furthermore, as can be seen in the graphs of FIGS. 6A-6I, some lines are shorter than others. The reason is that the computational cost per iteration is different for the algorithms in accordance with the present invention and as a result some algorithms take less time to execute than others. The computational cost of all these algorithms is determined by the number of evaluations of minus log the full conditional g of a stochastic variable. FIG. 7 depicts the average number of evaluations per variable X and Y for network M1 after 10,000 iterations of minus log the full conditional g(x) for 253 training points to localize 1. The Metropolis algorithms perform fewer evaluations compared to the slice sampling algorithms. The reason is that slice sampling algorithms that follow the step out and double out processes ("slice so" and "slice do" in the graphs) evaluate g several times until they get an estimate of the slice. In addition, all slice sampling methods follow a shrinkage procedure during which g could potentially be evaluated several times until the next value to be accepted is found. On the other hand, Metropolis algorithms evaluate g once before a candidate point y is proposed and once after.

Among the slice sampling algorithms, two-dimensional slice sampling ("slice2d wd") and univariate slice sampling ("slice wd") over the whole domain of X and Y have the fewest evaluations. The first of the two takes advantage of the fact that X and Y have the same full conditional and, as a result, g is estimated once when X and Y need to be updated, whereas the latter estimates g once for X and once for Y. Since "slice wd" and "slice2d wd" take the whole domain as an estimate of the slice, the only evaluations of g they perform is in the shrinkage process. Specifically, "slice wd" performs 4.13 evaluations per variable on average in the shrinkage process, out of which 2.13 are rejections. This is a clear indication that g is relatively flat, because the method can find a point within the slice with only a few rejections.

Figure 8:
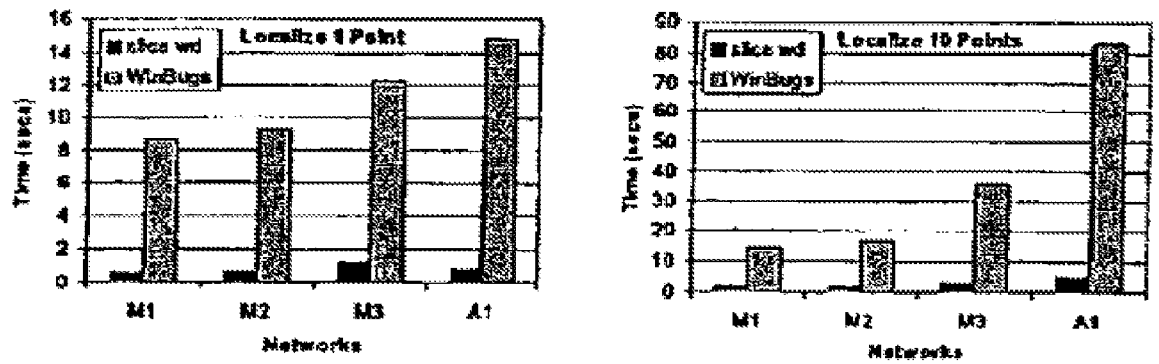
FIG. 8 is a pair of graphs showing the performance of an algorithm in accordance with the present invention as compared to an algorithm in accordance with WinBugs.

FIGS. 5C, 5D, 5G, and 5H depict the average execution time breakdown of Gibbs sampling, when slice sampling uses the "slice wd" method. "Slice wd" takes less time when compared to "slice so=1" that is shown in FIGS. 5A, 5B, 5E, and 5F. Particularly, slice sampling is 2.06 times faster for M3 to 2.57 times faster for A1 when localizing 1 point, and is 2.13 times faster for M3 to 2.51 times faster for A1 when localizing 10 points. Finally, FIG. 8 compares the average execution time (over 30 runs) of Gibbs sampling when using "slice wd" to WinBugs (over relax option set). The solver in accordance with the present invention is faster than WinBugs by a factor that ranges from 9.8 (M3) to 17.9 (A1) for localizing 1 point, and from 9.1 (M1) to 16.1 (A1) for 10 points.

No Location Information

Figure 9A:
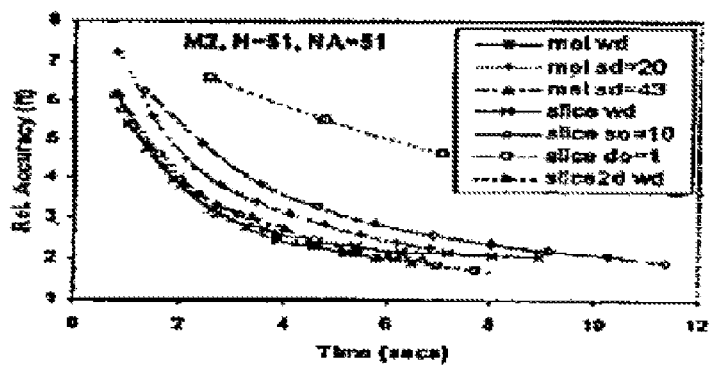
FIG. 9A is a graph showing the relative accuracy versus run time of a localization system comparing an algorithm in accordance with the present invention with several prior art algorithms.
Figure 9B:
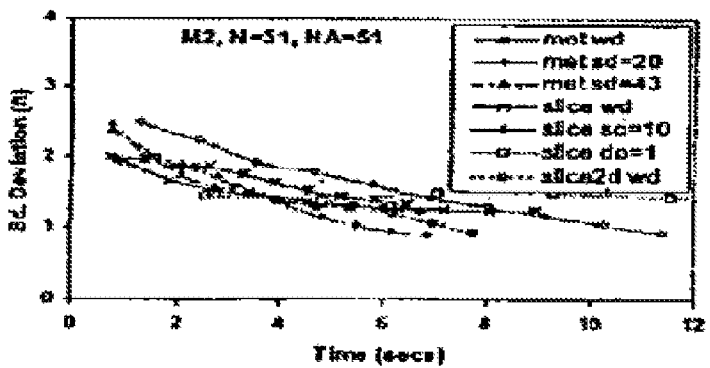
FIG. 9B is a graph showing the standard deviation versus run time of a localization system comparing an algorithm in accordance with the present invention with several prior art algorithms.

Madigan, D., Elnahrawy, E., Martin, R. P., Ju, W., Krishnan, P., and Krishnakumar, A., "*Bayesian indoor positioning systems*", INFOCOM, 2005, showed how M2 can localize points with no location information in the training set. However, when the solver was run for 51 signal vectors and with 51 unknown positions, the solver occasionally returned a solution different from WinBugs. The solver found an alternate, but incorrect, solution for the values of the coefficients of the linear regression model that describes how a signal degrades linearly with log distance. Specifically, although the parameters $b_{i0}$ and $b_{i1}$ (see FIGS. 2A-2D) are supposed to be negative and positive respectively, the solver found a solution with inverted signs for these parameters. When there is location information in the training set, alternate solutions are never rendered because the location information restricts the sign of $b_{i0}$ to be negative. So, $b_{i0}$ was bounded to be negative when there is no location information. FIGS. 9A and 9B show the performance of the solver of the present invention for seven of the algorithms after bounding $b_{i0}$. Specifically, FIGS. 9A and 9B are graphs showing the relative accuracy and standard deviation, respectively, versus run time of a localization system comparing an algorithm in accordance with the present invention with several prior art algorithms.

The Figures show that the solver localizes a point with relative accuracy of less than 3 ft in 6 seconds with all algorithms except "slice do" that converges more slowly to the WinBugs solution. The remaining two algorithms, "slice so=1" and "met sd=1" (not shown) perform poorly.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A computer-implemented Markov Chain Monte Carlo method of sampling for purposes of generating a sequence of instances of a Bayesian network such that a distribution of values across the sequence of instances follows the same distribution as the actual probability density function for at least one variable comprising:
   (a) selecting by a computer a function, g(X), that is directly proportional to a probability density function, f, where f provides a probability distribution of a particular value of a variable, X, in a Bayesian network;
   (b) selecting by a computer a first sample value of X uniformly distributed over the domain of X;
   (c) picking by a computer a random value, y, between 0 and the value of g(X) for the first value of X;
   (d) choosing by a computer another value of X uniformly distributed over the whole domain of X;
   (e) if the value g(X) for the another value of X is less than the random value, y, discarding the second value, $X_i$, and iterating (d), (e), and (f); and
   (f) if the value g(X) for the another value of X is greater than the random value, y, using the another value of X as a sample to generate a next instance of the Bayesian network.

2. The method of claim 1 wherein X comprises a plurality of variables.

3. The method of claim 1 comprising iterating (b), (c), (d), (e), and (f)

4. The method of claim 3 comprising iterating (b), (c), (d), (e), and (f) predetermined number of times.

5. The method of claim 3 comprising iterating (b), (c), (d), (e), and (f) until the sequence of network instances reaches a substantially stationary distribution.

6. The method of claim 3 wherein, for at least some of the repetitions of (b), the selected first value of X is the same value of the another value of X from a preceding iteration of (d).

7. A computer-implemented method of determining a location of a wireless device comprising:
   (a) observing a signal characteristic of the wireless device as measured at a plurality of known locations;
   (b) developing by a computer a Bayesian network modeling a probability density function of the signal characteristic of a wireless device as observed at the plurality of known locations as a function of a location of a wireless device relative to each of the plurality of known locations;
   (c) selecting by a computer a function that is directly proportional to a probability density function that provides a probability distribution of the signal characteristic as a function of a set of variables including at least one location variable of the wireless device and at least one other variable in the Bayesian network;
   d) selecting by a computer a first value of the set of variables uniformly distributed over the domain of the set of variables;
   (e) picking by a computer a random value between 0 and the value of function for the selected value of the signal characteristic;
   (f) choosing by a computer another value of the set of variables uniformly distributed over the domain of the signal characteristic;
   (g) if the value of the function for the another value of the set of variables is less than the random value, discarding the second value and repeating (f), (g), and (h); and
   (h) if the value of the function for the another value of the set of variables is greater than the random value, using the second value as a sample to generate a next instance of the Bayesian network; and
   (i) predicting by a computer a location of the wireless device as a function of the distribution of the at least one location variable from the plurality of instances.

8. The method of claim 7 wherein the wireless device comprises a plurality of wireless devices.

9. The method of claim 7 wherein the signal characteristic is signal strength.

10. The method of claim 7 wherein the at least one other variable includes an angle of arrival.

11. The method of claim 7 wherein the at least one other variable includes at least one signal propagation constant.

12. The method of claim 7 wherein the signal characteristic is a signal to noise ratio.

13. The method of claim 7 comprising iterating (d), (e), (f), (g), and (h).

14. The method of claim 13 wherein, for at least some of the iterations of (d), the selected value of the set of variables is the same value of the second set of values from a preceding iteration of (f).

15. A computer program product embodied on a tangible memory for sampling for purposes of generating a sequence of instances of a Bayesian network such that a distribution of values across the sequence of instances follows the same distribution as the actual probability density function for at least one variable comprising:
   (a) computer executable instructions for selecting a function, g(X), that is directly proportional to a probability density function, f, where f provides a probability distribution of a particular value of a variable, X, as a function of at least one other variable, K, in a Bayesian network;
   (b) computer executable instructions for selecting a first sample value of X uniformly distributed over the domain of X;
   (c) computer executable instructions for picking a random value, y, between 0 and the value of g(X) for the first value of X;
   (d) computer executable instructions for choosing another value of X uniformly distributed over the whole domain of X;
   (e) computer executable instructions for, if the value g(X) for the another value of X is less than the random value, y, discarding the another value of X and iterating (d), (e), and (f); and (f) computer executable instructions for, if the value g(X) for the another value of X is greater than the random value, y, using the another value of X as a sample to generate a next instance of the Bayesian network.

16. The computer program product of claim 15 comprising computer executable instructions for iterating (b), (c), (d), (e), and (f).

17. The computer program product of claim 16 wherein, for at least some of the repetitions, the computer executable instructions (b) select as the first value of X the same value of one of the another values of X, from a preceding repetition of (d).

* * * * *